United States Patent
Li et al.

(10) Patent No.: US 6,912,253 B1
(45) Date of Patent: Jun. 28, 2005

(54) METHOD AND APPARATUS FOR TRANSCODING CODED VIDEO IMAGE DATA

(75) Inventors: Han Li, Yokohama (JP); Toshio Miki, Yokohama (JP); Yasuhiro Ogiri, Tokyo (JP)

(73) Assignee: NTT DoCoMo, Inc., Tokyo (JP)

(*) Notice: Subject to any disclaimer, the term of this patent is extended or adjusted under 35 U.S.C. 154(b) by 1110 days.

(21) Appl. No.: 09/657,434

(22) Filed: Sep. 7, 2000

(30) Foreign Application Priority Data

Sep. 10, 1999 (JP) ............................................. 11-258119
Sep. 29, 1999 (JP) ............................................. 11-276557

(51) Int. Cl.[7] ............................ H04B 1/66; H04N 7/12; H04N 7/36
(52) U.S. Cl. .............................................. 375/240.12
(58) Field of Search ....................... 375/240.01, 240.02, 375/240.03, 240.09, 240.1, 240.12, 240.13, 240.14, 240.15, 240.16, 240.22, 240.23; 341/50; 382/236, 238, 240, 251; 348/412.1, 413.1, 414.1, 415.1, 409.1, 394.1; H04N 7/12, 7/36; H04B 1/66

(56) References Cited

U.S. PATENT DOCUMENTS

| | | | |
|---|---|---|---|
| 6,188,728 B1 * | 2/2001 | Hurst .................... | 375/240.16 |
| 6,404,814 B1 * | 6/2002 | Apostolopoulos et al. ...................... | 375/240.12 |
| 6,441,754 B1 * | 8/2002 | Wang et al. ................... | 341/50 |
| 6,498,814 B1 * | 12/2002 | Morel .................... | 375/240.12 |
| 6,590,936 B1 * | 7/2003 | Kadono .................. | 375/240.12 |
| 6,625,320 B1 * | 9/2003 | Nilsson et al. .............. | 382/238 |

FOREIGN PATENT DOCUMENTS

GB  2378601 A  *  2/2003  ............ H04N/7/36

OTHER PUBLICATIONS

Shanableh, T.; Ghanbari, M.; The importance of the bi-directionally predicted pictures in video streaming, Circuits and Systems for Video Technology, IEEE Transactions on , vol.: 11 Issue: 3 , Mar. 2001 pp.: 402 –414.*

* cited by examiner

*Primary Examiner*—Tung T. Vo
(74) *Attorney, Agent, or Firm*—Brinks Hofer Gilson & Lione

(57) ABSTRACT

A transcoding apparatus converts first coded data obtained from a plurality of frames forming a video image by means of a coding algorithms including an interframe prediction coding algorithm with motion compensation into second coded data having a different structure. More specifically, the transcoding apparatus takes a portion of frames which have had the interframe prediction coding and are included in the plurality of frames forming the video image as processing object frames, and from at least the first coded data corresponding to the processing object frames, generates the second coded data corresponding to coded data which are to be obtained when performing the interframe prediction coding on the processing object frames with reference to second reference frames which are different from first reference frames referenced in the interframe prediction coding of the processing object frames. In order to the second coded data, the transcoding apparatus has a motion information calculating portion for calculating motion information to be included in the second coded data using at least motion information contained in said processing object data.

20 Claims, 27 Drawing Sheets

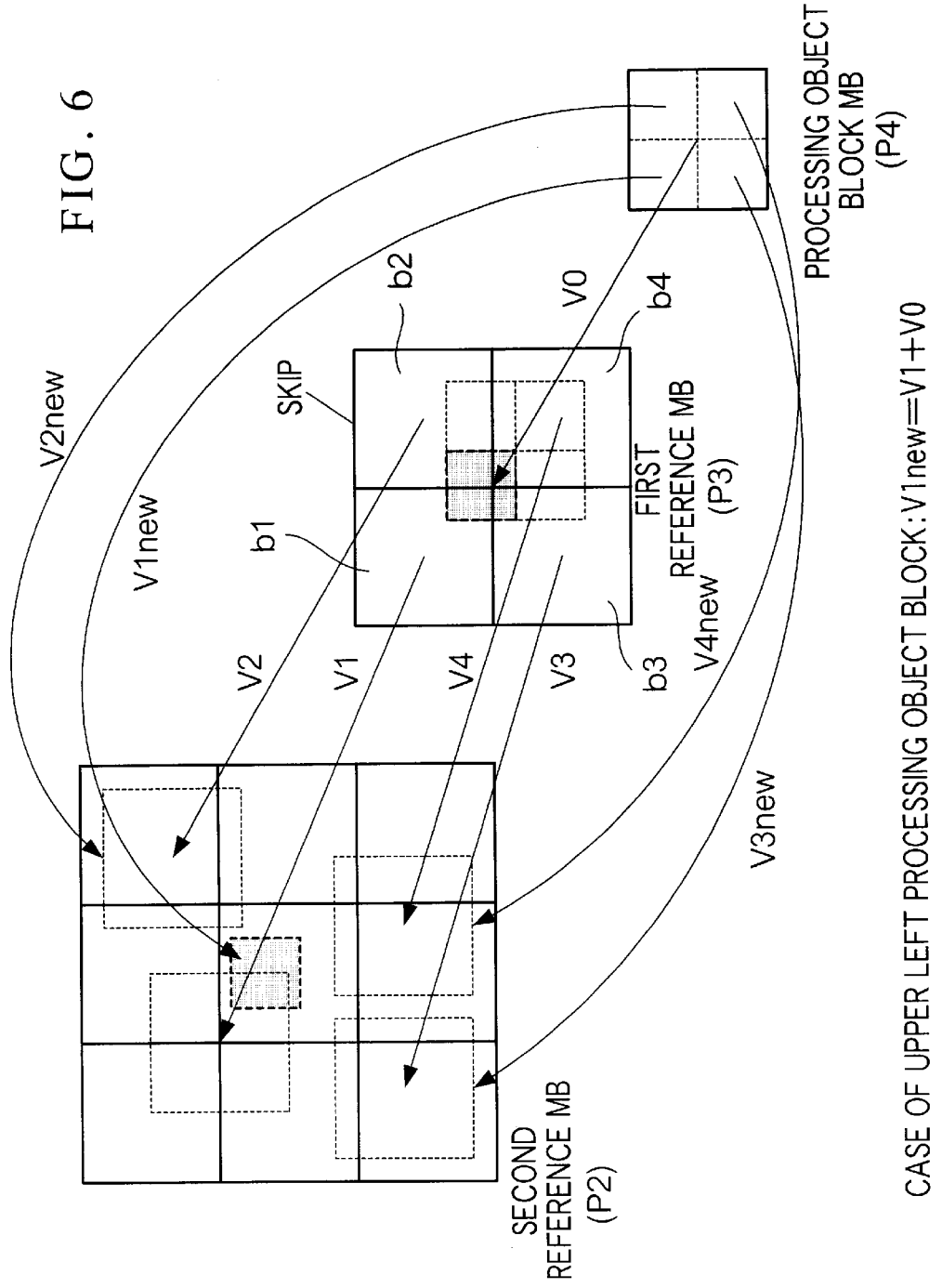

Vnew=V4+V0−△V4

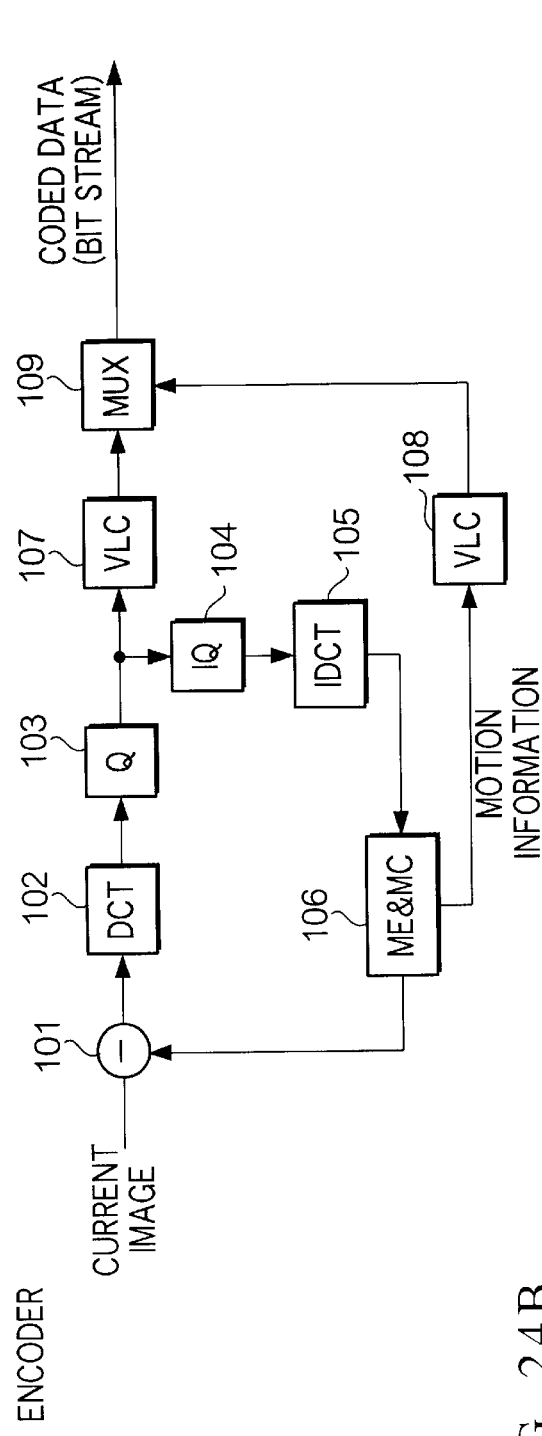
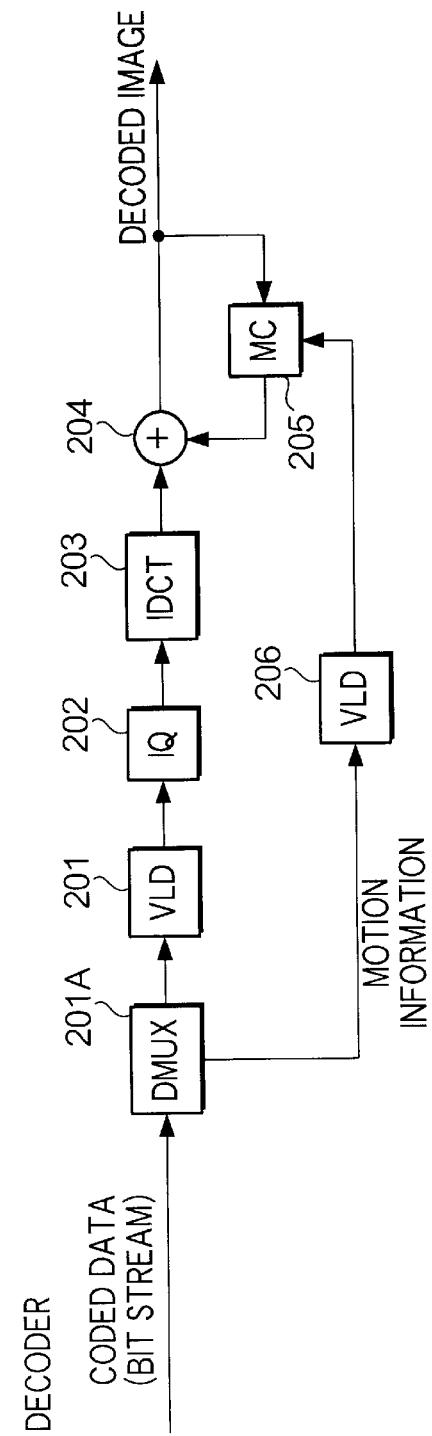
FIG. 24A ENCODER
FIG. 24B DECODER

METHOD AND APPARATUS FOR TRANSCODING CODED VIDEO IMAGE DATA

BACKGROUND OF THE INVENTION

1. Field of the Invention

The present invention relates to the art of video image information compression and transmission, and particularly to a transcoding method and transcoding apparatus for converting coded video image data into coded video image data complying with different data rates.

2. Background Art

Multimedia which express different types of information such as text, pictures, audio and video as digital data and combine these media to handle them integrally have garnered much attention in recent years. As audio-video coding formats which support multimedia, there is the ISO/IEC's MPEG (Moving Picture Experts Group) 1 and the like, and various video image coding and transmission systems which are compliant therewith have been offered.

FIGS. 24A and 24B show general structures for this type of video image coding and transmission system, FIG. 24A being a block diagram showing the structure of a transmission side encoder and FIG. 24B being a block diagram showing the structure of a reception side decoder.

The transmission side encoder, as shown in FIG. 24A, comprises a subtractor 101, a DCT (Discrete Cosine Transform) portion 102, a quantizer 103, a dequantizer 104, an inverse DCT portion 105, a motion prediction and compensation portion 106, variable-length encoders 107 and 108, and a multiplexing device 109.

The reception side decoder, as shown in FIG. 24B, comprises a demultiplexing device 201A, variable-length decoders 201 and 206, a dequantizer 202, an inverse DCT portion 203, an adder 204 and a motion compensation portion 205. The various components of the encoder and decoder listed above can be constructed of exclusive hardware, or else constructed from a DSP (digital signal processor) or the like performing predetermined programs.

In the structures shown in FIGS. 24A and 24B, image information of a picture group composed of a predetermined number of frames are supplied sequentially to the encoder. The encoder codes the image information in units of these picture groups. One I frame must be contained in each picture group, in addition to which one or more P frames or B frames may be included. Here, the I frame is a frame which is the object of so-called intraframe coding. Additionally, a P frame is a frame in which coding and decoding are performed by referencing the image of a frame before that frame, and a B frame is a frame in which coding and decoding are performed by referencing the frames before and after that frame.

FIG. 25 shows examples of operations of the encoder in a case wherein the frames constituting a picture group are sequentially supplied. In this FIG. 25, an example of a case where the I frames and P frames are inputted to the encoder with the P1 frame and P2 frame following the I frame is given for simplicity of explanation. Herebelow, the operations of the encoder shall be explained with reference to FIG. 25.

First, when image information corresponding to an I frame is inputted, processing is not performed by the various constituent elements of the encoder in FIG. 24A, but intraframe coding of image information of the current image (I frame) is performed by means of a predetermined coding algorithm, and the resulting coded data are transmitted to the reception side. Additionally, in the encoder, the image information of the I frame is decoded from the coded data in accordance with a decoding algorithm corresponding to the above-described coding algorithm, and stored in a memory (not shown) in the motion prediction and compensation portion 106 as a reference image.

Next, when the P1 frame is inputted, the current image (P1 frame) is divided into a plurality of macroblocks MBij (i=1-M, j=1-N) in the encoder. Here, each macroblock is composed of 2×2=4 blocks, and each block is composed of 8×8=64 pixels. Then, in the encoder, the macroblocks MBij are processed in the following way.

First, the motion prediction and compensation portion 106 searches a reference macroblock MBij' of the same size and identical to the macroblock MBij of the current image from among the reference images (in this case, the I frame). It assumes that this reference macroblock MBij' has moved to form the macroblock Mbij. The motion prediction and compensation portion 106 outputs motion information V which represents its spatial distance and direction of movement. Here, the motion information V is converted by the variable-length encoder 206 into a variable-length code.

The subtractor 101 subtracts the image information of the reference macroblock MBij' from the image information of the macroblock MBij to determine the difference between the images, and the DCT portion 102 performs a DCT which is a type of orthogonal transform on this difference.

The quantizer 103 quantizes the DCT coefficient of the difference image obtained from the DCT portion 102, and the variable-length encoder 107 converts the data obtained from this quantization to a variable-length code.

The variable-length code of the quantized DCT coefficient and the variable-length code of the above-described motion information V are multiplexed by the multiplexing device 109, and transmitted to the reception side as coded data corresponding to the macroblock MBij.

On the other hand, the output data from the quantizer 103 are dequantized by the dequantizer 104, then the output data of the dequantizer 104 are inputted to the inverse DCT portion 105. As a result, a difference image Δ is outputted from the inverse DCT portion 105. While this difference image Δ is image information corresponding to the difference between the macroblock MBij of the current image (P1 frame) and the reference macroblock MBij', it is generated through the processes of DCT, quantization, dequantization and inverse DCT and as such includes errors associated therewith.

The motion prediction and compensation portion 106 restores the image information of the macroblock MBij in the current image (frame P1) by means of methods such as adding the difference image Δ obtained from the inverse DCT portion 105 with the reference macroblock MBij', then stores this in the memory as a reference image as a reference for coding of subsequent frames.

The above-described processes are performed on all of the macroblocks MBij (i=1-M, j=1-N) constituting the current image (P1 frame).

Then, when the next frame P2 is inputted, the reference image (image of the frame P1) stored in the memory of the motion prediction and compensation portion 106 is referenced to perform a coding process similar to that described above. The same applies to all frames subsequent to the frame P2.

FIG. 26 gives examples of the operations of the decoder upon receiving coded data of the I frame, P1 frame, P2 frame, . . . . transmitted from the encoder as descried above. Herebelow, the operations of the decoder shall be explained with reference to FIG. 12.

First, when the intraframe coded data of the I frame is received, the decoder of FIG. 24B does not perform processing by the various constituent elements that are shown, but decodes the intraframe coded data in accordance with a decoding algorithm corresponding to the intraframe coding algorithm on the encoder side. As a result, the same I frame image information as that stored in the memory of the motion prediction and compensation portion 106 on the encoder side is decoded, and this is stored as a reference image in a memory (not shown) in the motion compensation portion 205 in the decoder.

Next, the coded data of the P1 frame is inputted to the decoder. This coded data contains the following information corresponding to each of the plurality of macroblocks MBij (i=1-M, j=1-N) obtained by dividing the image of the P1 frame.

a. A variable-length code obtained by DCT quantization and variable-length coding of the difference between the relevant macroblock MBij and the reference macroblock MBij' in the reference image (frame I) which is similar thereto.

b. A variable-length code of the motion information V indicating the motion vector from the reference macroblock MBij' to the relevant macroblock MBij.

In the decoder, the variable-length codes of the above-mentioned a and b are separated by the demultiplexing device 201A, and returned to actual numerical values by means of the variable-length decoders 201 and 206. Then, in accordance with this information, the following processes are performed for each macroblock MBij.

First, a difference image Δ between the macroblock MBij and the reference macroblock MBij' in the reference image (frame I) is restored from the actual numerical values obtained from the variable-length code of the above-mentioned a, by means of the dequantizer 202 and the inverse DCT portion 203.

Additionally, in the motion compensation portion 205, the location of the reference macroblock MBij' in the reference image (frame I) corresponding to the relevant macroblock MBij is determined in accordance with the motion information V described in b above, and the image information of this reference macroblock MBij' is read from the internal memory (not shown). Then, the image information of the reference macroblock MBij' and the above-described difference image Δ are added by the adder 204, and the image information of the macroblock MBij is restored.

The above procedures are performed in all of the macroblocks MBij (i=1-M, j=1-N) to restore the entire image of the frame P1. The restored image of this frame P1 is stored in the memory of the motion compensation portion 205 as a reference image.

Then, when the coded data corresponding to the next frame P2 is received, the reference image (image of frame P1) stored in the memory of the motion compensation portion 205 is referenced in performing the same decoding processes as described above. The same applies for cases of receiving coded data corresponding to other frames subsequent to the frame P2.

Recently, the coded transmission of video images in various types of communication systems has been considered. For this reason, coded video image data are generated under the assumption of transmission at a certain transmission rate, but there may be cases in which the coded data must be transmitted at a transmission rate different from the original plan.

In this type of case, the number of frames per picture group must be reduced to decrease the data rate of the coded data. As a technology for achieving this, there is transcoding, which is the conversion of the format of coded data. FIG. 27A shows a method for transcoding, and FIG. 27B is a block diagram showing the structure of a conventional transcoding apparatus for transcoding.

As shown in FIG. 27B, the conventional transcoding device has a structure combining a decoder 100 with the same structure as that shown in FIG. 24B, and an encoder 200 with the same structure as that shown in FIG. 24A.

With this transcoding apparatus, as shown in FIG. 27A, the coded data generated by a first coding method is decoded by the decoder 100, and the image obtained by this decoding is coded according to a second coding method by the encoder 200. By recoding in this way, it is possible to generate coded data having a data rate different from the original coded data.

However, since the conventional transcoding method described above decodes an original image from coded data and generates coded data with a different data rate by recoding this image, it is heavy in processing and inefficient, and there is the problem of the picture quality falling due to conversion errors associated with the decoding and recoding of coded data.

SUMMARY OF THE INVENTION

The present invention has been made in view of the above-explained situation, and has the purpose of offering a transcoding method and transcoding apparatus which is capable of converting coded data into coded data having other formula with less caliculation process.

The present invention provides a transcoding method for converting first coded data obtained from a plurality of frames forming a video image by means of a coding algorithms including an interframe prediction coding algorithm with motion compensation into second coded data having a different structure, the transcoding method characterized by comprising an interframe prediction coded data re-editing step of taking a portion of frames which have had the interframe prediction coding and are included in the plurality of frames forming the video image as processing object frames, and from at least the first coded data corresponding to the processing object frames, generating the second coded data corresponding to coded data which are to be obtained when performing the interframe prediction coding on the processing object frames with reference to second reference frames which are different from first reference frames referenced in the interframe prediction coding of the processing object frames, the interframe prediction coded data re-editing step including a motion information calculating step of calculating motion information to be included in said second coded data using at least motion information contained in said processing object data.

BRIEF DESCRIPTION OF THE DRAWINGS

FIG. 6 is a diagram for explaining another example of the processing of the motion information calculating circuit.

FIGS. 24A and 24B are block diagrams showing the general structure of an encoder and decoder in a video image coding and transmitting system.

PREFERRED EMBODIMENTS OF THE INVENTION

Herebelow, embodiments of the present invention shall be described with reference to the drawings.

A. First Preferred Embodiment

A-1. Transcoding

Figure 1:
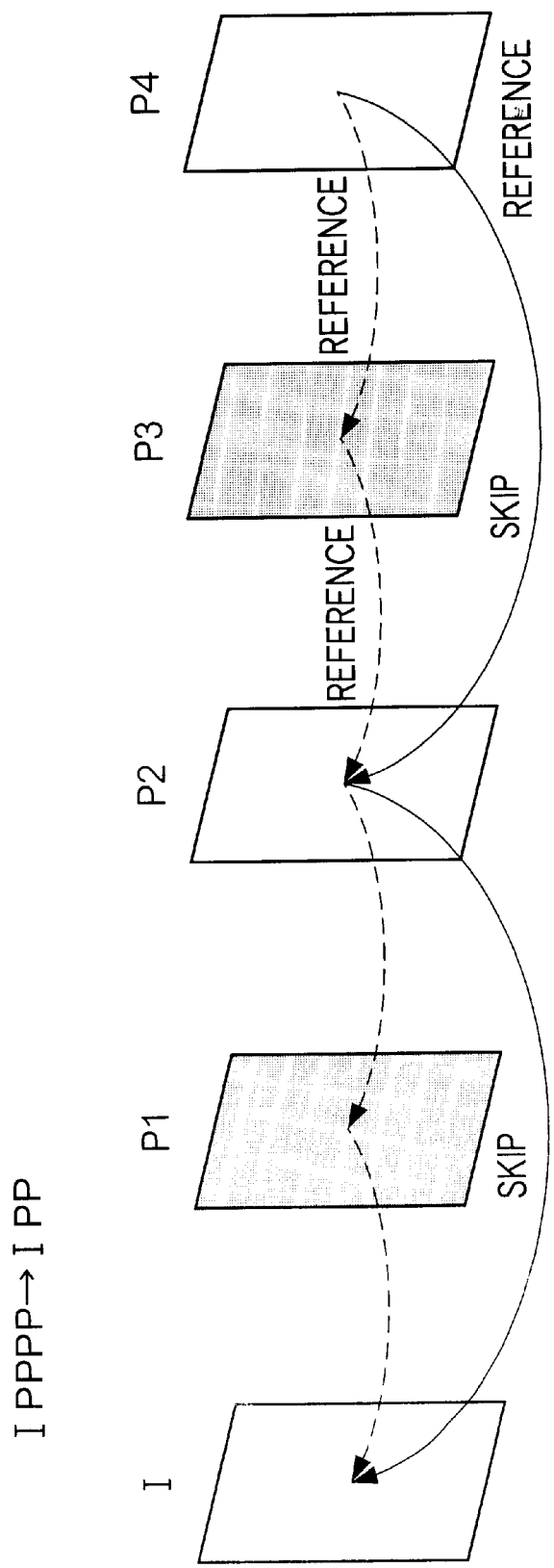
FIG. 1 is a diagram showing an example of transcoding performed in a first embodiment of the present invention.

FIG. 1 is a diagram showing an example of transcoding performed in a first preferred embodiment of the present invention. FIG. 1 shows a picture group composed of an I frame and P1–P4 frames. In the present embodiment, coded data with a low data rate is generated by omitting the P1 frame and P3 frame from these frames. Here, the P2 frame references the discarded P1 frame and the P4 frame references the discarded P3 frame. Consequently, by omitting the coded data which corresponds to the P1 frame and P3 frame, it becomes impossible to decode the images of the P2 frame and P4 frame from the remaining coded data.

In the present embodiment, frames to be discarded are taken as first reference frames (in this example, P1 frame and P3 frame), frames on which interframe prediction coding has been performed by reference to the first reference frames are taken as processing object frames (in this example, P2 frame and P4 frame), and frames which have been referenced to perform interframe prediction coding on the first reference frames are taken as second reference frames (in this example, I frame and P2 frame). Second coded data are then calculated based on the coded data corresponding to the processing object frames and the coded data corresponding to the first reference frames. The second coded data correspond to coded data to be obtained when performing interframe prediction coding of the processing object frames by reference to the second reference frames. This process described above is the interframe prediction coded data re-editing process.

A-2. Transcoding Apparatus

Figure 2:
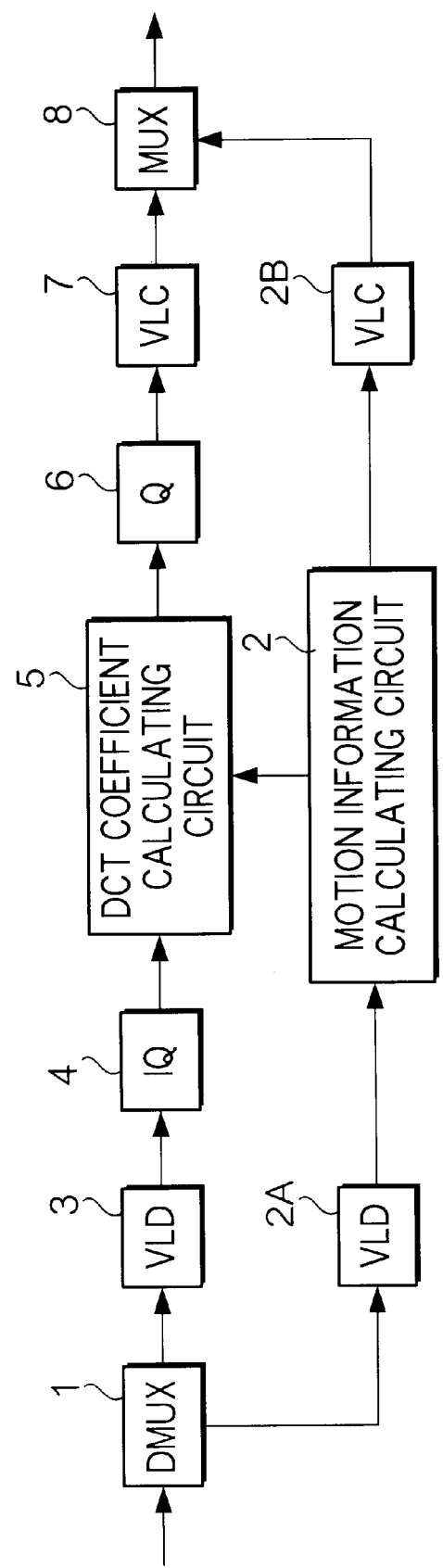
FIG. 2 is a block diagram showing a transcoding apparatus according to the same embodiment.

FIG. 2 is a block diagram showing the structure of a transcoding apparatus for performing the transcoding method of the present embodiment. In FIG. 2, the demultiplexing device 1 separates coded data corresponding to frames other than the I frame into variable length codes of motion information and variable-length codes of quantized DCT coefficients obtained by interframe prediction coding.

The variable-length decoder 21A restores from the variable codes of motion information to actual numerical values.

The motion information calculating circuit 2 is a circuit for performing motion information calculation which is a part of the the interframe prediction coded data re-editing process. More specifically, the motion information calculating circuit 2 receives from the variable-length decoder 21A the motion information corresponding to the processing object frames, the motion information corresponding to the first reference frames, the motion information corresponding to the second reference frames and the motion information corresponding to the other frames. When the motion information calculating circuit 2 receives the motion information corresponding to the processing object frame, it calculates new motion information based on the motion information corresponding to the processing object frame and the motion information corresponding to the first reference frame and outputs the new motion information instead of the original motion information. The new motion information corresponds to the motion information to be obtained when performing interframe prediction coding on the processing object frame by reference to the second reference frame. The motion information corresponding to the first reference frames is discarded. The motion information corresponding to the other frames passes through the motion information calculating circuit 2.

The variable-length encoder 2B is a circuit for converting motion information outputted from the motion information calculating circuit 2 to a variable-length code.

The variable-length decoder 3 is a device for decoding quantized data of the DCT coefficient from the variable-length codes outputted from the demultiplexing device 1. Additionally, the dequantizer 4 is a device for dequantizing this quantized data and outputting a DCT coefficient.

The DCT coefficient calculating circuit 5 is a circuit for performing DCT coefficient calculation which is a part of the interframe prediction coded data re-editing process. More specifically, the DCT coefficient calculating circuit 5 receives from the variable-length decoder 3 the DCT coefficients corresponding to the processing object frames, the DCT coefficients corresponding to the first reference frames, the DCT coefficients corresponding to the second reference frames and the DCT coefficients corresponding to the other frames. When the DCT coefficient calculating circuit 5 receives the DCT coefficients corresponding to the processing object frame, it calculates new DCT coefficients based on the DCT coefficients corresponding to the processing object frame and the DCT coefficients corresponding to the first reference frame and outputs the new DCT coefficients instead of the original DCT coefficients. The new DCT coefficients correspond to the DCT coefficients to be obtained when performing interframe prediction coding on the processing object frame by reference to the second reference frame. The DCT coefficients corresponding to the first reference frames is discarded. The DCT coefficients corresponding to the other frames passes through the DCT coefficient calculating circuit 5.

The quantizer 6 is a device for quantizing the DCT coefficients outputted from the DCT coefficient calculating circuit 5, and outputting the quantized data. The variable-length encoder 7 is a device for variable-length coding and outputting the quantized data.

The multiplexer 8 is a device for multiplexing and outputting variable length codes of motion information of frames obtained from the variable-length encoder 22, and variable-length codes corresponding to DCT coefficients of frames obtained from the variable-length encoder 7.

Next, the processing of the motion information calculating circuit 2 shall be described in detail. For example, the case where the P3 frame in FIG. 1 is discarded shall be considered. In this case, the P3 frame is the first reference frame, the P4 frame is the processing object frame and the P2 frame is the second reference frame. Here, the coded data corresponding to the processing object frame (P4 frame) contains motion information for each macroblock in the same frame, but this motion information represents motion from the state of the first reference frame (P3 frame). Accordingly, when the first reference frame (P3 frame) is discarded, it is necessary to find the area that each macroblock in the processing object frame (P4 frame) takes up in the second reference frame (P2 frame), and to determine the new motion information (referred to as P2–P4 motion information) corresponding to motion from each area to the position of each macroblock in the processing object frame. Therefore, in the motion information calculating circuit 2 of the present embodiment, the P2–P4 motion information is calculated by the following method.

Figure 3:
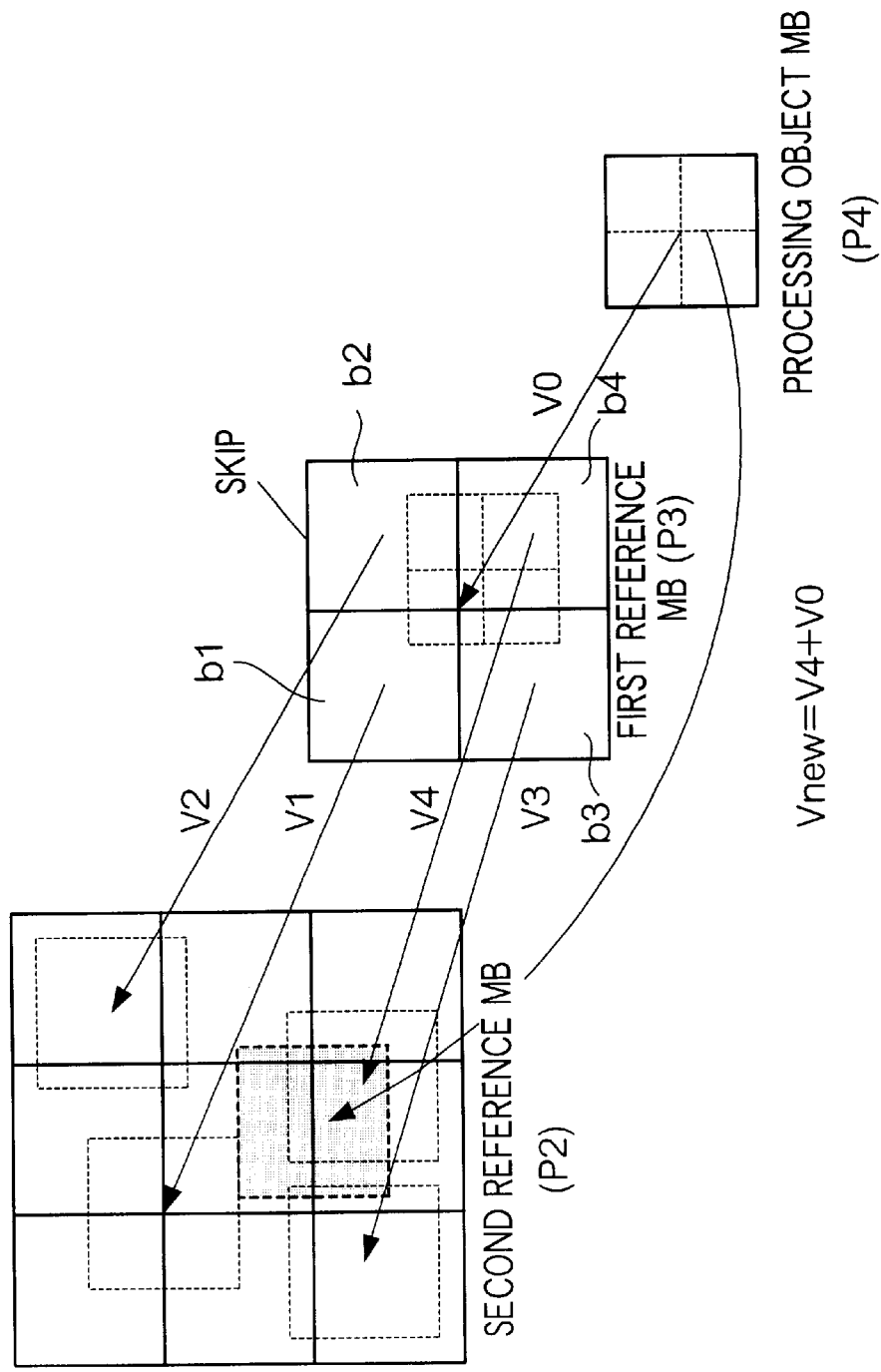
FIG. 3 is a diagram showing an example of the processing in the motion information calculating circuit in the same embodiment.

In FIG. 3, the processing object MB is one of the macroblocks constituting the processing object frame (P4 frame). Here, when a macroblock (hereinafter referred to as the first reference MB) similar to the image of the processing object MB is contained in the P3 frame, the motion information V0 corresponding to motion from the first reference MB to the current MB is contained in the coded data of the processing object frame (P4 frame). Consequently, it is possible to determined the position of the first reference MB in the first reference frame from the position of the processing object MB in the processing object frame and the motion information V0.

However, even if an image similar to the first reference MB (hereinafter referred to as the second reference MB) is included in the second reference frame (P2 frame), it is not possible to determine the position of the image directly from the motion information of the first reference frame (P3 frame). The reason is as follows.

In general, the first reference MB will not match with any of the macroblocks into which the first reference frame (P3 frame) is divided, and will overlap with four macroblocks as shown in the drawing. Here, the motion information is information that is determined for each macroblock constituting a frame, and motion information V1–V4 is determined for each of the four macroblocks which the first reference MB overlaps. However, none of these macroblocks matches the first reference MB. In this way, motion information corresponding to the first reference MB does not exist for the coded data of the first reference frame (P3 frame), thus making it impossible to determine the location of the second reference MB in the second reference frame (P2 frame) directly from the motion information.

Therefore, in this motion information calculating circuit 2, the motion information corresponding to motion from the second reference MB to the processing object MB is calculated as follows.

Step S1: First, the motion information calculating circuit 2 selects, from among the four macroblocks which the first reference MB overlaps, the motion information corresponding to the macroblock with the largest area overlapping with the first reference MB. In the example shown in FIG. 3, macroblock b4 is the macroblock of the four in which the area of the portion overlapping the first reference MB is the largest, and motion information V4 corresponding to this macroblock b4 is chosen.

Step S2: Next, the motion information calculating circuit 2 performs the following operation using the motion information V0 corresponding to the processing object MB and the motion information V4 found in step S2 above, to determine a calculated motion information value Vnew corresponding to the motion from the second reference MB to the processing object MB.

$$V\text{new} = V4 + V0 \quad (1)$$

The motion information calculating circuit 2 performs the processes described above with each of the macroblocks in the processing object frame (P4 frame) as the processing object MB, and for each macroblock, determines a calculated motion information value Vnew corresponding to motion from the second reference MB (corresponding to each macroblock) to the relevant macroblock in the processing object frame (P4 frame).

Additionally, when there are a plurality of discarded frames as shown by way of example in FIG. 1, the motion information calculating circuit 2 determines the calculated motion information values between frames referenced discarded frames and frames referencing discarded frames by a procedure similar to the above.

Figure 4:
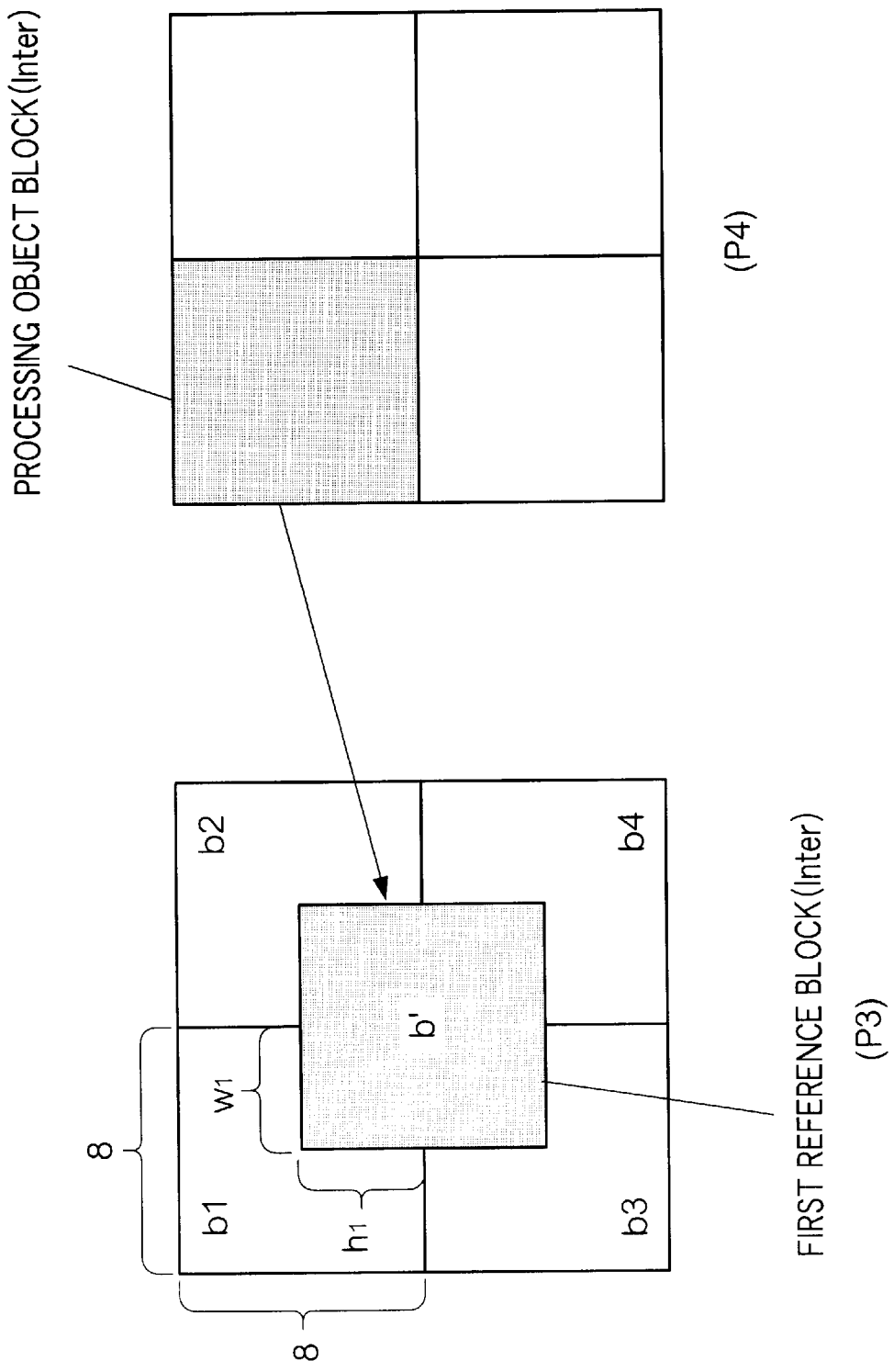
FIG. 4 is a diagram showing the processing in the DCT coefficient calculating circuit in the same embodiment.

Next, the processing of the DCT coefficient calculating circuit 5 shall be explained in detail. FIG. 4 shows one of the processing object MBs contained in the processing object frame (P4 frame). Each processing object MB is composed of four blocks as shown. In the interframe prediction coding method assumed by the present embodiment, the DCT of the interframe difference images is performed in units of these blocks. Herebelow, the procedure for correction of the DCT coefficient of the difference image corresponding to one of the blocks (hereinafter referred to as the processing object block) in the processing object MB shown in the drawing.

First, FIG. 4 shows one of the MBs divided from the first reference frame (P3 frame), this MB containing a block b' similar to the image of the processing object block of the processing object frame (P4 frame). Herebelow, this block b' shall be called the first reference block for the sake of convenience.

If the DCT coefficient of the difference image between the second reference frame (P2 frame) and the first reference frame (P3 frame) corresponding to this first reference block b' is obtained from the coded data of the first reference frame, then the DCT coefficient corresponding to the processing object block can be corrected to content referencing the second reference frame (P2 frame) by adding this DCT coefficient to the DCT coefficient corresponding to the processing object block of the processing object frame (P4 frame). However, the DCT coefficient supplied from the dequantizer 4 to the DCT coefficient calculating circuit 5 is the DCT coefficient corresponding to blocks divided from each frame, among which there are no DCT coefficients corresponding to the first reference block b'. Therefore, a DCT coefficient corresponding to the first reference block b' is calculated in the DCT coefficient calculating circuit 5 of the present embodiment in the following way.

First, in FIG. 4, the first reference block b' overlaps four blocks b1–b4 in the first reference frame. The DCT coefficient calculating circuit 5 determines respectively the horizontal length w1 and vertical length h1 of the portion of the first reference block b' which intrudes into block b1, the horizontal length w2 and vertical length h2 of the portion of the first reference block b' which intrudes into block b2, the horizontal length w3 and vertical length h3 of the portion of the first reference block b' which intrudes into block b3, and the horizontal length w4 and vertical length h2 of the portion of the first reference block b' which intrudes into block b4.

Next, taking the matrix of DCT coefficients corresponding to each block bi (i=1–4) as Bi (i=1–4), the DCT coefficient calculating circuit 5 determines the matrix B' of calculated DCT coefficient values corresponding to the first reference block b' as follows.

$$B' = \sum_{i=1}^{4} H_{Hi} \cdot B_i \cdot H_{wi} \qquad (2)$$

Here, $H_{Hi}$ is the DCT coefficient of $h_{hi}$, $H_{wi}$ is the DCT coefficient of $h_{wi}$, and $h_{hi}$ and $h_{wi}$ are given as follows.

$$h_{h1} = h_{h2} = \begin{pmatrix} 0 & I_{hi} \\ 0 & 0 \end{pmatrix} \qquad (3)$$

$$h_{h1} = h_{h2} = \begin{pmatrix} 0 & 0 \\ I_{wi} & 0 \end{pmatrix} \qquad (4)$$

$$h_{h3} = h_{h4} = \begin{pmatrix} 0 & 0 \\ I_{hi} & 0 \end{pmatrix} \qquad (5)$$

$$h_{w2} = h_{w4} = \begin{pmatrix} 0 & I_{wi} \\ 0 & 0 \end{pmatrix} \qquad (6)$$

In each of the above equations, the meanings of the matrices using $I_{hi}$ and $I_{wi}$ are as follows. That is, if for example hi=4, then the above equations can be rewritten as shown below.

$$\begin{pmatrix} 0 & I_{hi} \\ 0 & 0 \end{pmatrix} = \begin{pmatrix} 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{pmatrix} \qquad (7)$$

$$\begin{pmatrix} 0 & 0 \\ I_{hi} & 0 \end{pmatrix} = \begin{pmatrix} 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \end{pmatrix} \qquad (8)$$

The DCT coefficient calculating circuit 5 calculates a DCT coefficient of a difference image between the second reference frame (P2 frame) and the first reference frame (P3 frame) corresponding to the first reference block b', adds this DCT coefficient to the DCT coefficient of the processing object block, and obtains the DCT coefficient of the difference image between the second reference frame (P2 frame) and the processing object frame (P4 frame).

Then, the DCT coefficient calculating circuit 5 performs the same type of processing as above with respect to other blocks inside the processing object frame (P4 frame), and corrects the DCT coefficients of all blocks inside the processing object frame.

While an example of a case of omitting the P3 frame has been explained above, the same will apply to cases of omitting other frames as well.

This completes the details on the transcoding apparatus according to the present embodiment.

Figure 5:
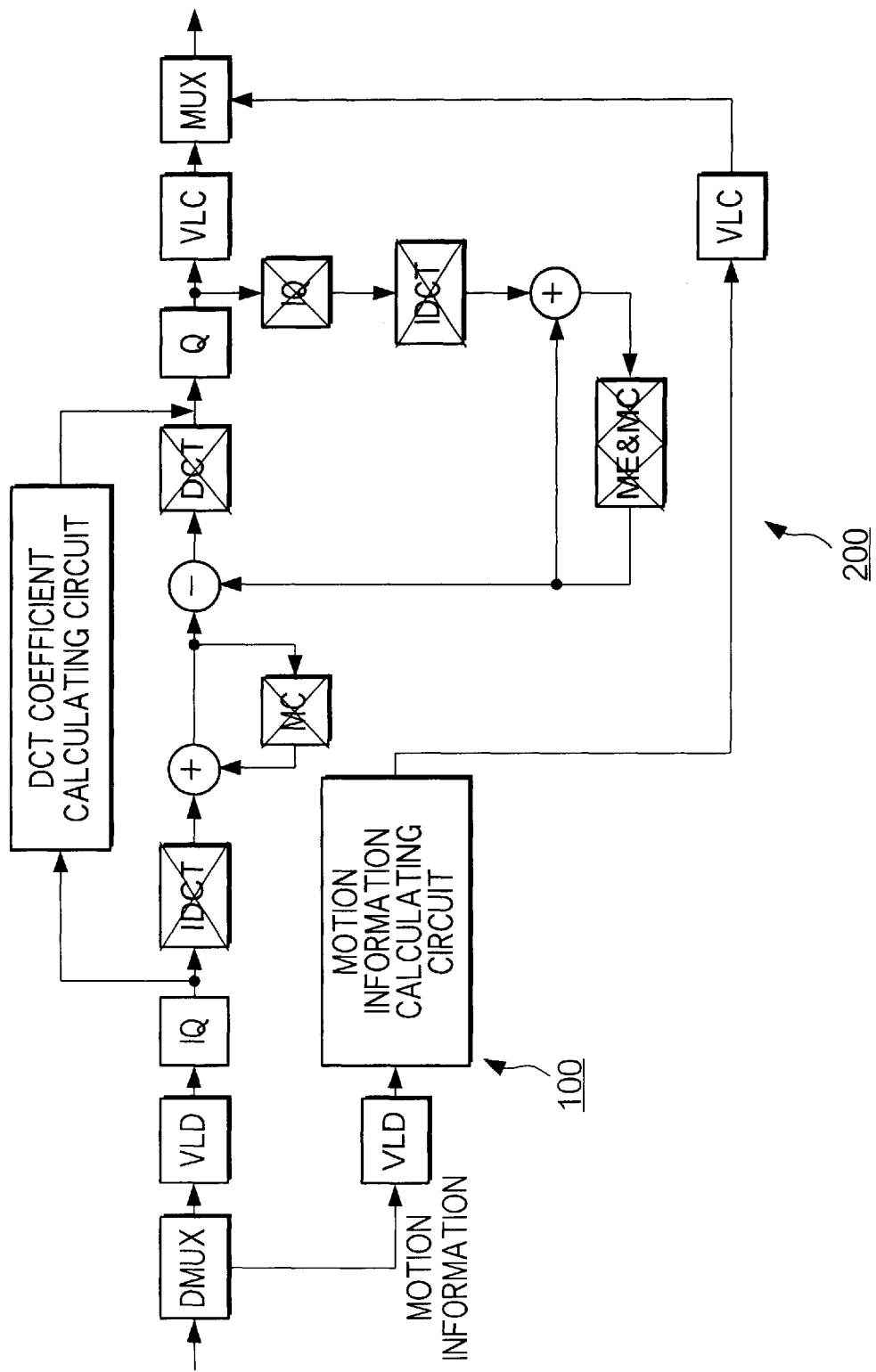
FIG. 5 is a diagram for explaining the effects of the same embodiment as compared with a conventional transcoding apparatus.

FIG. 5 shows the structure of a transcoding apparatus according to the present embodiment, showing the parts of the transcoding apparatus according to the conventional art which have been eliminated. According to the present embodiment, coded data with specific frames discarded are generated by processing the coded data as is without decoding images from the coded data, so that the inverse DCT for decoding the image, the DCT for recoding the decoded image, dequantization, inverse DCT, motion prediction and compensation are unnecessary. Thus, errors occurring due to these unnecessary conversions are eliminated, and degradation of the image quality associated with transcoding can be reduced, and the amount of processing and processing time required for transcoding are largely reduced. Additionally, since the images are not decoded from the coded data, there is no need for a memory for storing decoded images, and the hardware of the transcoding apparatus can be made smaller.

A-3. Other Examples of Motion Information Calculation Algorithm

In the first preferred embodiment of the present invention, an example of motion information calculation performed by the motion information calculating circuit 2 (see FIG. 2) is disclosed. However, there are other examples of motion information calculation algorithm which may be performed by the the motion information calculating circuit 2.

A-3-1. Example-1

FIG. 6 shows another example of motion information calculation algorithm performed by the motion information calculating circuit 2 (see FIG. 2). This algorithm offers a transcoding method and transcoding apparatus for generating coded data capable of performing motion compensation by the block as in MPEG-4 or H.263. Herebelow, the motion information calculation algorithm shall be described, taking as an example a case that the P3 frame between the P2 frame and P4 frame is discarded.

In this algorithm, the motion information is calculated by the following procedure.

Step S1: First, motion information V0 corresponding to the relevant processing object MB is selected from coded data of the processing object frame (P4 frame), and a first reference MB corresponding to the processing object MB in the first reference frame (P3 frame) is determined from this motion information V0.

Step S2: Next, for each first reference block divided from the first reference MB in the first reference frame(P3 frame), motion information corresponding to the macroblock of which the area of the portion overlapping the first reference block is largest among the macroblocks in the first reference frame (P3 frame) is determined. In the example of FIG. 6, with regard to the upper-left first reference block, the area overlapping the upper left macroblock is largest, so that motion information V1 corresponding to this upper left macroblock is chosen from among the coded data of the first reference frame (P3 frame). Additionally, with regard to the upper right first reference block, the area overlapping the upper right macroblock is largest, so that motion information V2 corresponding to the upper right macroblock is chosen from the coded data of the the first reference frame (P3 frame). Additionally, with regard to the lower left first reference block, the area overlapping the lower left macroblock is largest, so that motion information V3 corresponding to the lower left macroblock is chosen from among the coded data of the first reference frame (P3 frame). Finally, with regard to the lower right first reference block, the area overlapping the lower right macroblock is largest, so that motion information V2 corresponding to the lower right macroblock is chosen from among the coded data of the first reference frame (P3 frame).

Step S3: From the motion information V0 of the above-described step S1 and the motion information V1–V4 chosen for each first reference block in step S2, motion information V1new–V4new of the four processing object blocks divided from the processing object macroblock is determined to compensate the motion from the second reference frame (P2 frame) to the processing object frame (P4 frame).

$$V1\text{new}=V1+V0$$
$$V2\text{new}=V2+V0$$
$$V3\text{new}=V3+V0$$
$$V4\text{new}=V4+V0 \qquad (9)$$

According to this algrithm, motion information with respect to the reference image is obtained for each block divided from the processing object macroblock, thus making it possible to perform transcoding for generating coded data which is optimal for a coding method wherein motion compensation is possible for each block.

A-3-2. Example-2

Figure 7B:
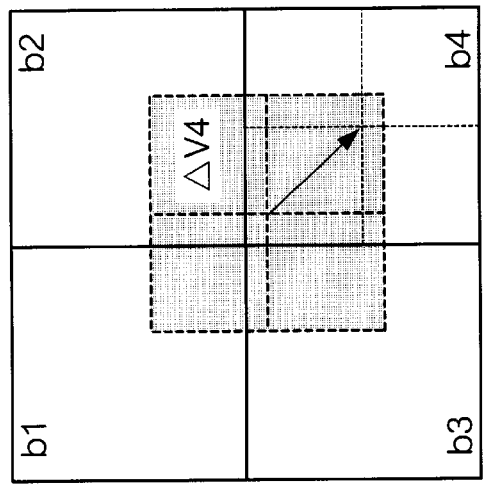
FIGS. 7A and 7B are diagrams for explaining another example of the processing of the motion information calculating circuit.
Figure 7A:
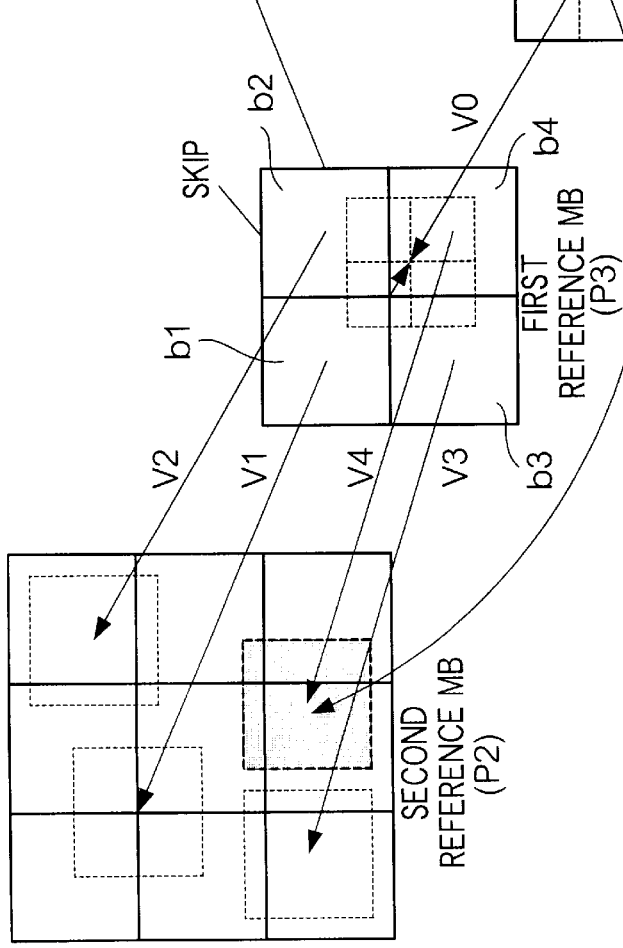

FIGS. 7A and 7B shows another example of motion information calculation algorithm performed by the motion information calculating circuit 2 (see FIG. 2). Herebelow, the motion information calculation algorithm will be described, taking as an example a case that the P3 frame between the P2 frame and P4 frame is discarded.

In this algorithm, the motion information is calculated by the following procedure.

Step S1: First, as shown in FIG. 7A, motion information V0 corresponding to the processing object MB is determined from the coded data of the processing object frame (P4 frame), and from this motion information V0, a first reference MB corresponding to that processing object MB in the first reference frame (P3 frame) is determined.

Step S2: Next, the macroblocks b1–b4 which overlap the first reference MB from among the macroblocks in the first reference frame (P3 frame) are determined, and the motion information corresponding to the macroblock of which the area of the portion overlapping the first reference MB is largest among these macroblocks b1–b4 is determined. In the example of FIG. 7A, the area of the overlapping portion is largest between the first reference MB and the macroblock b4 which is shown at the lower right among the four macroblocks b1–b4 illustrated, so that motion information V4 corresponding to this macroblock b4 is chosen from among the coded data of the first reference frame (P3 frame).

Step S3: Next, the motion information $\Delta V4$ from the center of the first reference MB to the center of the macroblock b4 of which the area of the portion overlapping this first reference MB is largest in the first reference frame (P3 frame) is determined (see FIG. 7B).

Step S4: Motion information Vnew from the second reference frame (P2 frame) to the processing object MB in the processing object frame (P4 frame) is determined from the motion information V0 of the above-given step S1, the motion information V4 determined in step S2 and the motion information $\Delta V4$ determined in step S3.

$$V\text{new}=V4+V0-\Delta V4 \qquad (10)$$

A-4. Another Example of DCT Coefficient Calculation Algorithm

Next, another example of the DCT coefficient calculation algorithm of the DCT coefficient calculating circuit in the present embodiment shall be described, taking as an example of the case shown in FIGS. 7A and 7B. In this example, a DCT coefficient corresponding to the processing object MB after omitting the first reference frame (P3 frame) is calculated by the following procedure.

Step S1: First, the DCT coefficient corresponding to the processing object MB (i.e. the DCT coefficient of the difference between the processing object MB and the first reference MB) is determined from the coded data of the processing object frame (P4 frame).

Step S2: Next, the DCT coefficient corresponding to the macroblock b4 of which the portion overlapping the first reference MB is largest among the macroblocks b1–b4 overlapping the first reference MB in the first reference frame (i.e. the DCT coefficient of the difference between the macroblock b4 and the second reference MB) is determined.

Step S3: Next, the DCT coefficient corresponding to the processing object MB determined in step S1 and the DCT coefficient corresponding to the macroblock b4 determined in step S2 are added, and the results of the addition are taken as the DCT coefficient corresponding to the processing object MB after discard of the first reference frame (P3 frame).

In this algolithm, a DCT coefficient corresponding to the processing object MB can be obtained by simply adding the DCT coefficients, and there is no need to perform operations such as Equation (2) in the above-described preferred embodiment, thus having the advantage of being able to reduce the amount of processing.

The DCT coefficient calculating circuit in the present embodiment can be such as to combine the other example of motion information calculating algorithm described above.

A-5. Modification-1

Figure 8:
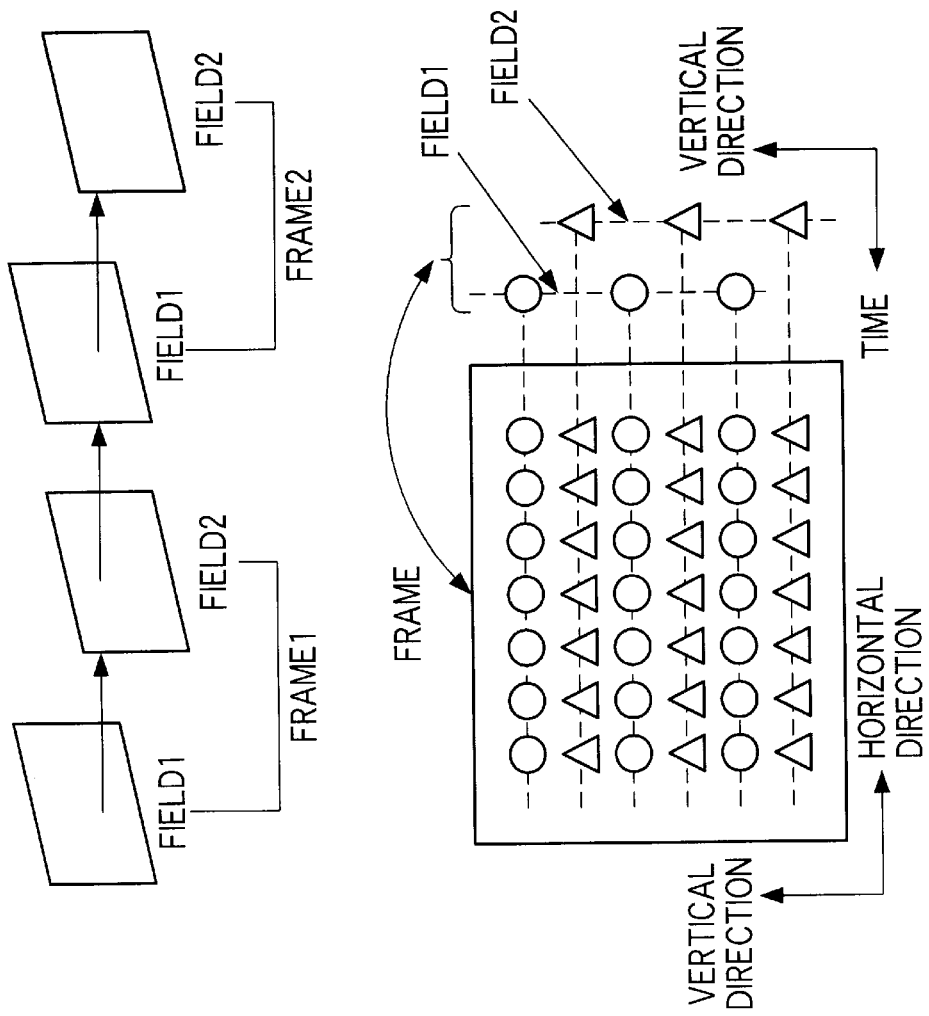
FIG. 8 is a diagram showing the concept of fields in a modification of the same embodiment.

In the embodiments described above, the concept of frames in picture groups was used, but the present invention is not restricted to use with frames, and is just as applicable to coding formats such as MPEG-2 which handle fields. For example, in the case of a television signal, as shown in FIG. 8, a single frame is composed of two fields. Then, interframe prediction coding is performed between the odd fields and between the even fields of adjacent frames. In the case of transcoding of coded data obtained by interframe prediction coding such as this, it is possible to calculate motion information and DCT coefficients by the same basic procedures as those outlined for the above-described embodiments. That is, it is sufficient simply to take each field in a frame as a processing object frame, and to calculate the motion information and calculate the DCT coefficients as per the above-described embodiments.

A-6. Modification-2

In the embodiments described above, a P frame in the picture group is discarded. In contrast thereto, in the present embodiment, the B frame, for example in a picture group having an IBBP structure is discarded, and the motion information and DCT coefficients of the coded data of the B frames which remain in this case are modified to reduce the amount of data.

Figure 9:
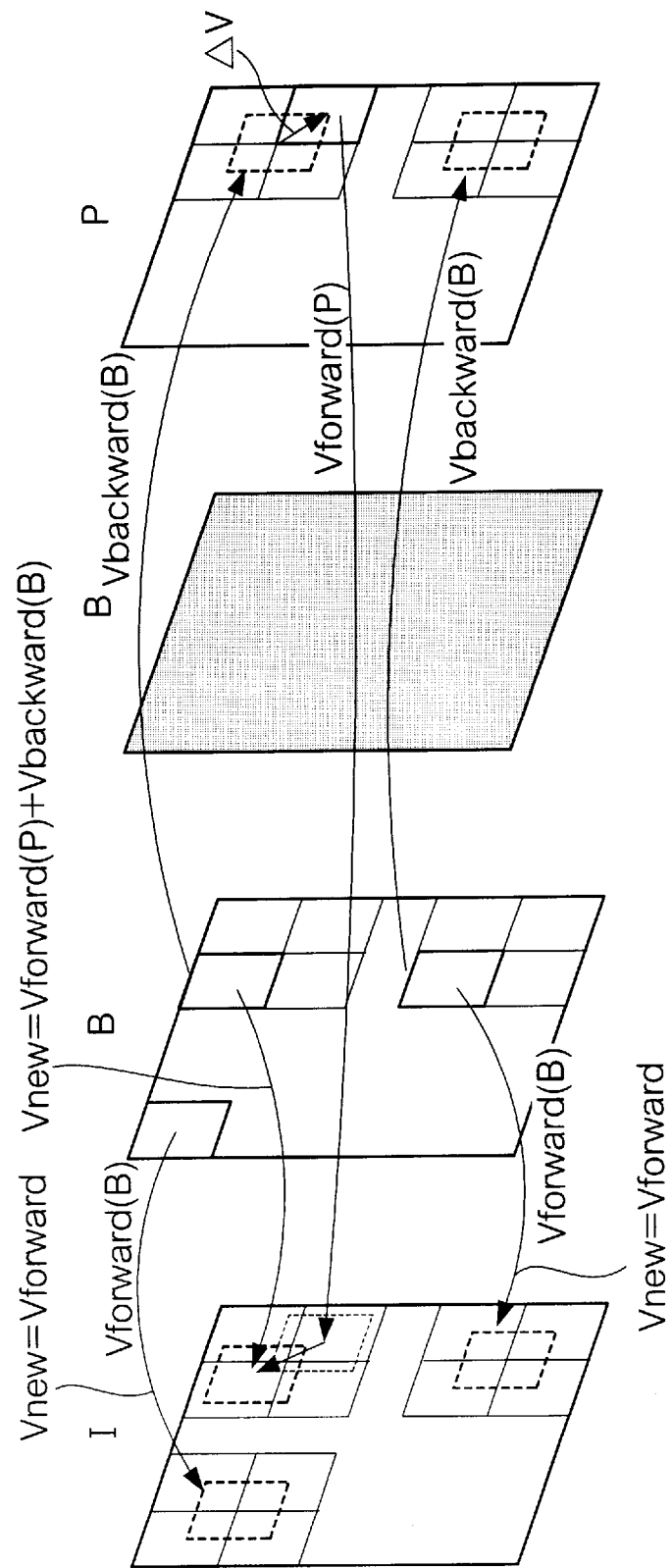
FIG. 9 is a diagram showing the processing of a motion information calculating circuit according to a modification of the same embodiment.

Herebelow, with reference to FIG. 9, a transcoding method according to the modification shall be described. In the picture group shown in FIG. 9, there are two B frames between the I frame and P frame. These B frames generate respective coded data by referencing the I frame and P frame. Here, of these B frames, the B frame preceding the P frame shall be discarded. When this discard is performed, the B frame following the I frame remains, but this B frame contains the next three type of macroblocks.

a. A macroblock which has been interframe prediction coded by a forward prediction mode. That is, a macroblock wherein the coded data contains motion information referencing only the previous frame (in this example, the I frame).

b. A macroblock which has been interframe prediction coded by a bidirectional prediction mode. That is, a macroblock wherein the coded data contains motion information referencing the previous frame (in this example, the I frame) and motion information referencing the following frame (in this example, the P frame).

c. A macroblock which has been interframe prediction coded by a backward prediction mode. That is, a macroblock wherein the coded data contains motion information referencing only the following frame (in this example, the P frame).

In the modification, the coded data of these three types of macroblocks a–c are processed as follows.

<Processing of Coded Data of Macroblock a>

With regard to the coded data of this macroblock, the motion information (forward) Vforward (B) and DCT coefficient are left as is.

<Processing of Coded Data of Macroblock b>

With regard to the coded data of this macroblock, only the motion information (forward) Vforward (B) referencing the previous frame is left, and the motion information (backward) Vbackward (B) referencing the following frame is eliminated. Additionally, the DCT coefficients of the difference image after motion compensation are left.

<Processing of Coded Data of Macroblock c>

With regard to the coded data of this macroblock, this macroblock is taken as a processing object macroblock, the following frame (P frame) is taken as the first reference frame, the previous frame (I frame) is taken as the second reference frame, and the DCT coefficient corresponding to this macroblock is changed to content that references the second reference frame. FIG. 9 shows an example wherein the motion information calculation method disclosed in the above-described embodiment is applied to this modification. That is, in the example shown in FIG. 9, motion information referencing the second reference frame with respect to this macroblock is obtained by the procedures indicated below.

a. Motion information Vbackward (B) corresponding to that processing object MB is determined from the coded data.

b. A first reference macroblock corresponding to that processing object macroblock in the first reference frame (P frame) is determined from the motion information Vbackward (B).

c. Motion information Vforward (P) corresponding to the MB of which the area of the portion overlapping the first reference MB is largest among the MBs in the first reference frame (P frame) is determined.

d. From the motion information in the above-given a–c, motion information Vnew for compensating for the motion between the second reference frame (I frame) referenced to generate coded data of the first reference frame (P frame) and the processing object MB is calculated.

$$Vnew = Vforward\ (P) + Vbackward\ (B) \quad (11)$$

This completes the detailed explanation of the process for calculating motion information in the present embodiment.

As in the case of the motion information above, the change of the DCT coefficient corresponding to the B frame can be performed by using the above-described first embodiment.

By following the above-described processes, the B frame which remained after discard becomes a P frame referencing only the previous frame (I frame in this example).

While the above example is a case wherein the method for calculating motion information and DCT coefficients according to the first embodiment is used, it is of course possible to apply methods for calculating the motion information and DCT coefficients disclosed as other example or modification of the first embodiment.

Additionally, while a case wherein the B frame is discarded from an IBBP structure has been explained for the above example, the present embodiment is applicable to a case where one of two B frames between two P frames is discarded from an IBBPBBP structure.

B. Second Preferred Embodiment

B-1. Examples Of Transcoding

Figure 10A:
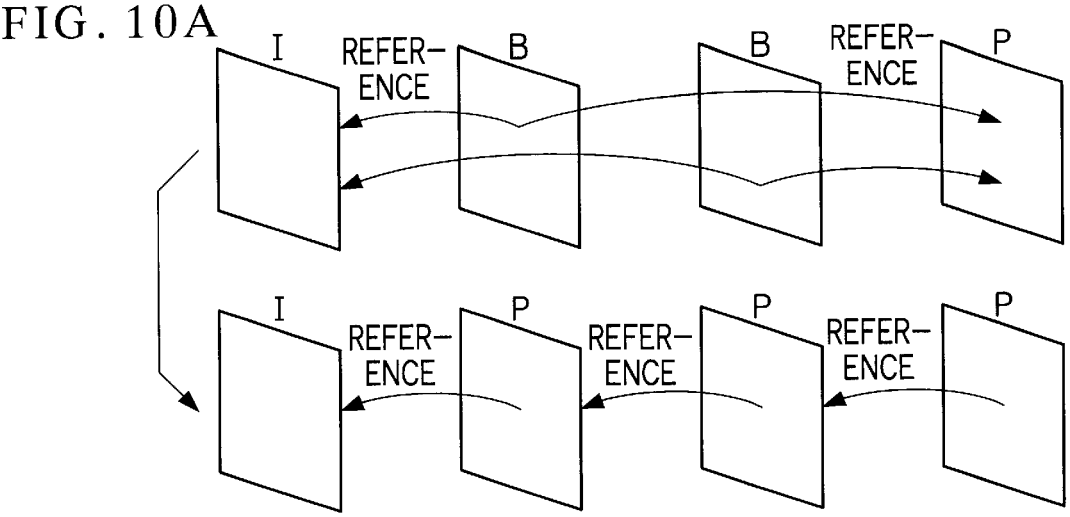
FIGS. 10A–10C are diagrams showing examples of transcoding performed in a second preferred embodiment of the present invention.
Figure 10B:
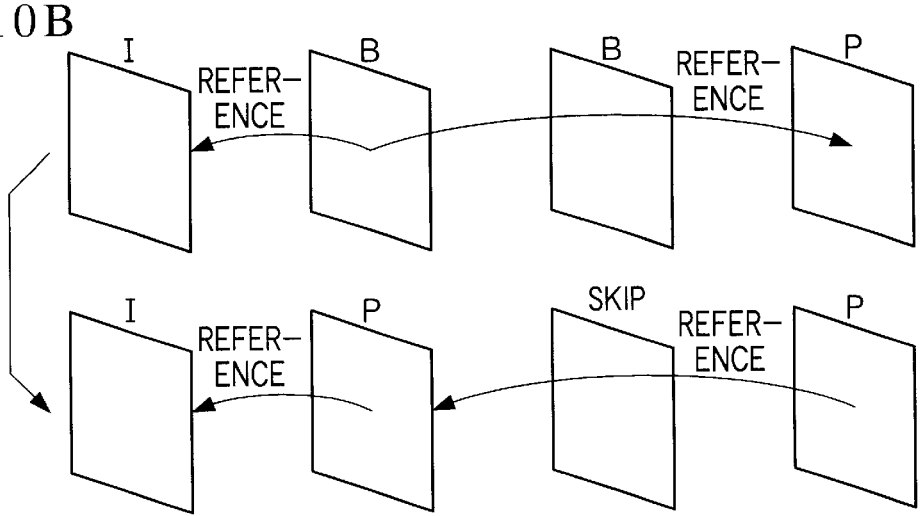
Figure 10C:
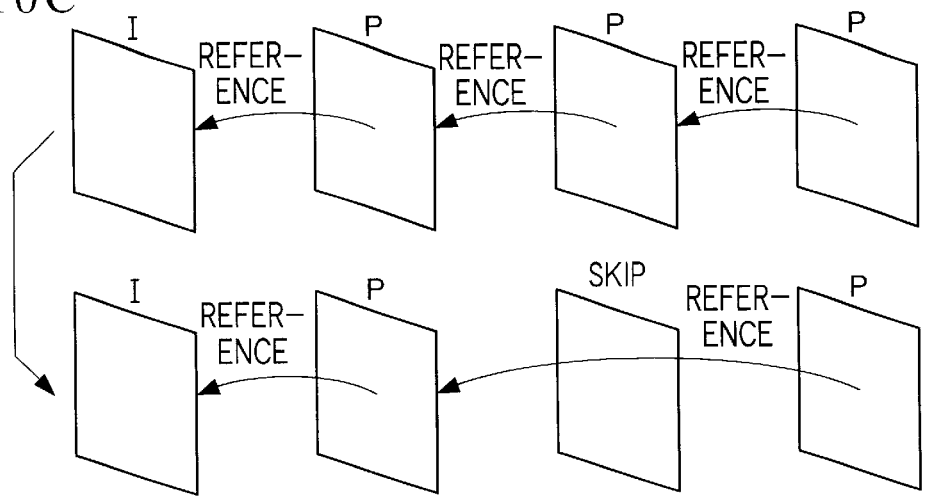

FIGS. 10A–10C are diagrams showing examples of transcoding performed in the second preferred embodiment of the present invention. First, in the example shown in FIG. 10A, transcoding is performed to convert coded data corresponding to a picture group composed of an I frame, two B frames and a P frame to coded data corresponding to a picture group composed of an I frame and three P frames.

In this example, the coded data corresponding to a B frame prior to transcoding is generated by referencing image data of the preceding I frame and the image data of the subsequent P frame, and includes motion information for performing motion compensation with respect to the I frame (forward prediction) and motion compensation with respect to the P frame (backward prediction).

In the example shown in FIG. 10B, the coded data corresponding to the B frame which is the latter of the two B frames in the example shown in FIG. 10B is discarded, the coded data corresponding to the B frame immediately after the I frame is converted to coded data of a P frame referencing only the I frame, and coded data corresponding to the last P frame in the picture group is converted so as to reference this P frame.

Next, in the example shown in FIG. 10C, when coded data corresponding to a picture group composed of an I frame and three P frames is given, one of the three P frames is discarded, and converted to coded data corresponding to a picture group composed of an I frame and two P frames.

B-2. Transcoding Apparatus

Figure 11:
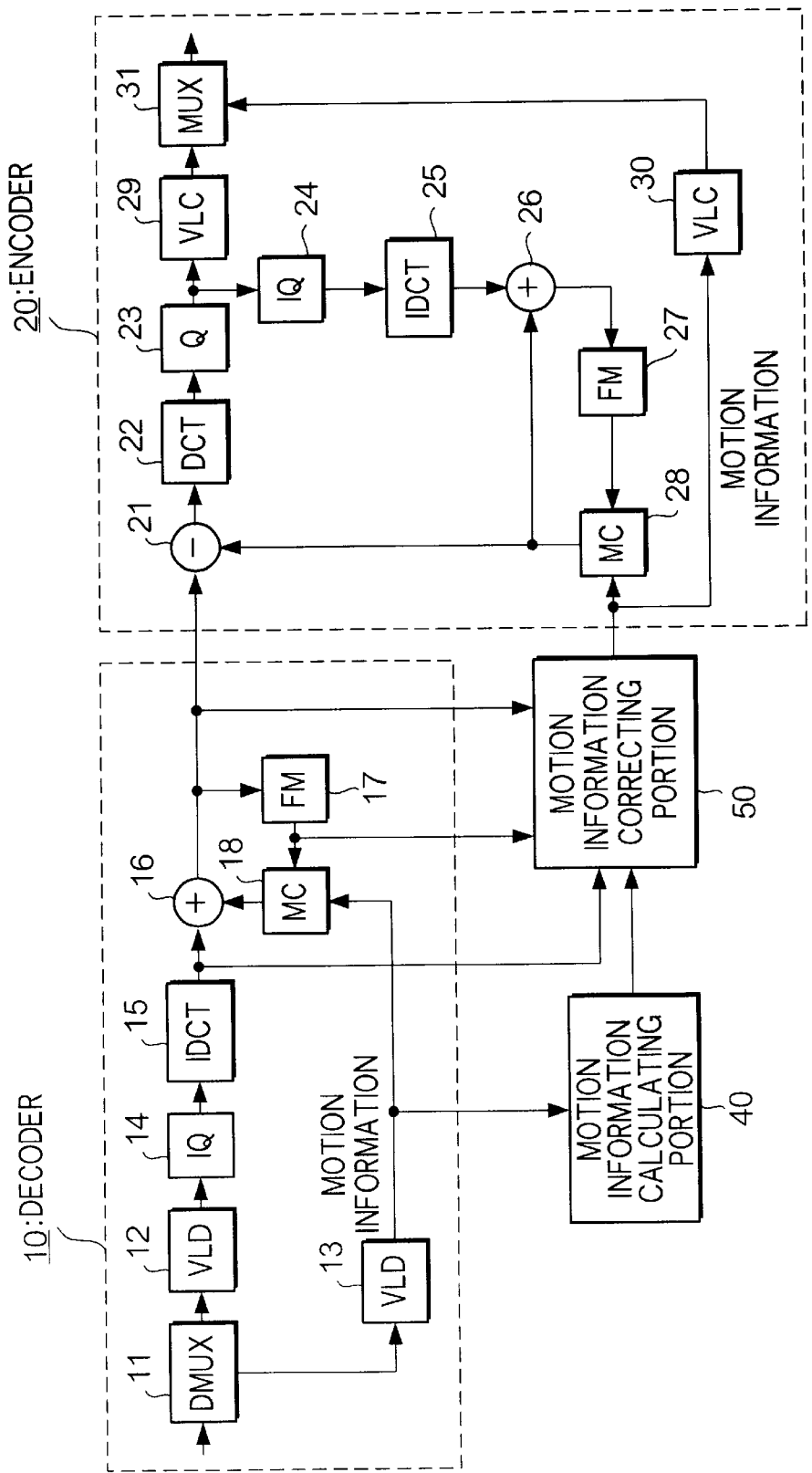
FIG. 11 is a block diagram showing a transcoding apparatus according to the same embodiment.

FIG. 11 is a block diagram showing the structure of a transcoding apparatus according to the second preferred embodiment of the present invention. As shown in FIG. 11, this transcoding apparatus comprises a decoder 10, an encoder 20, a motion information calculating portion 40 and a motion information correcting portion 50.

Of these, the decoder 10 is means for receiving coded data coded by a certain coding algorithm, and restoring original image data from this coded data, and comprising a demultiplexer 11, variable-length decoders 12 and 13, a dequantizer 14, an adder 16, a frame memory 17 and a motion compensation portion 18.

Figure 26:
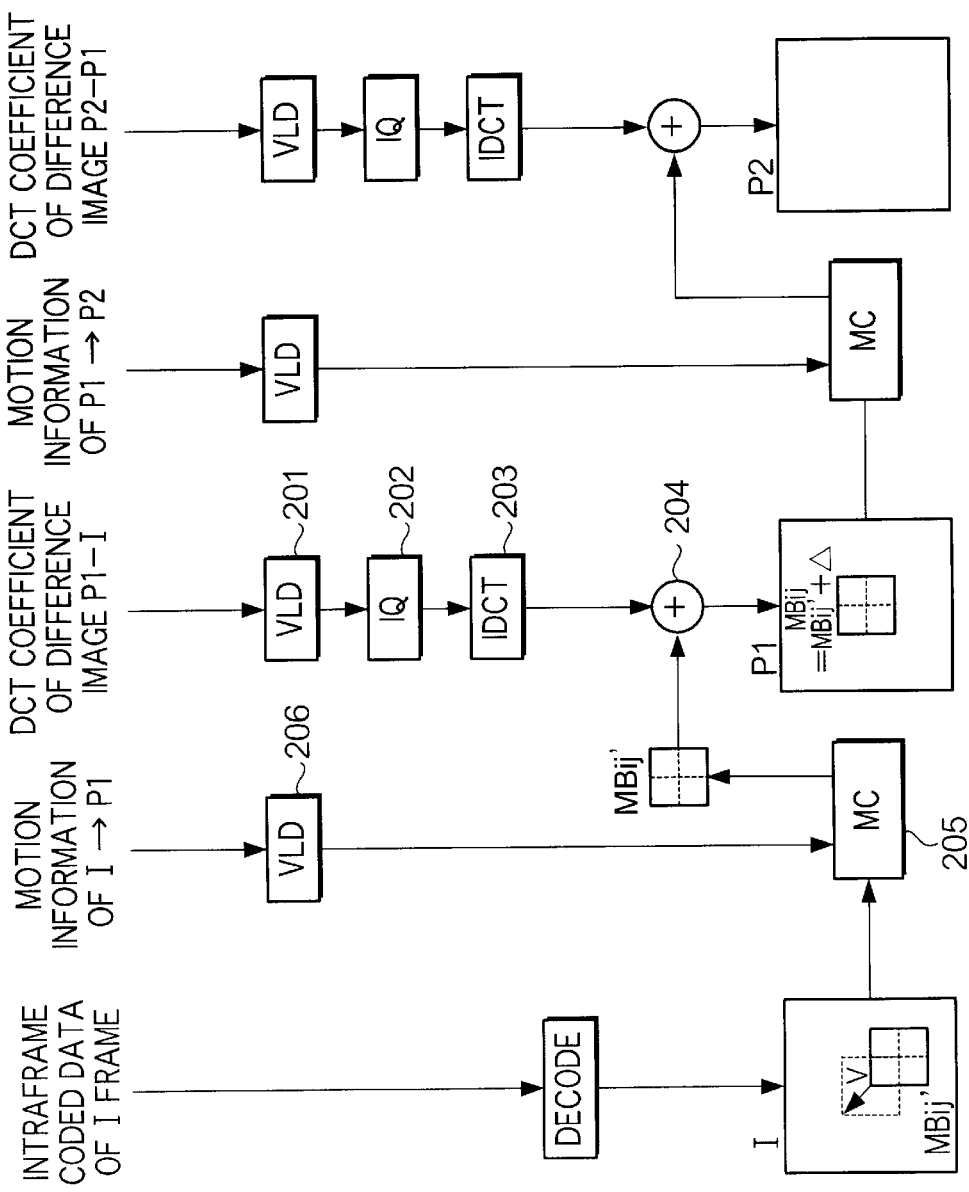
FIG. 26 is a diagram showing an example of operation of the above-mentioned decoder.
Figure 27A:
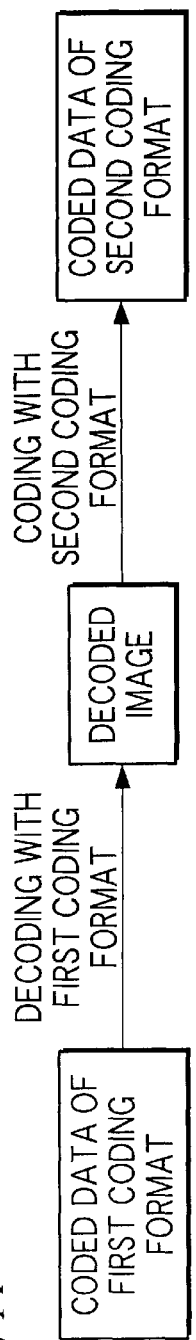
FIGS. 27A and 27B are diagrams showing a conventional transcoding method and transcoding apparatus.
Figure 27B:
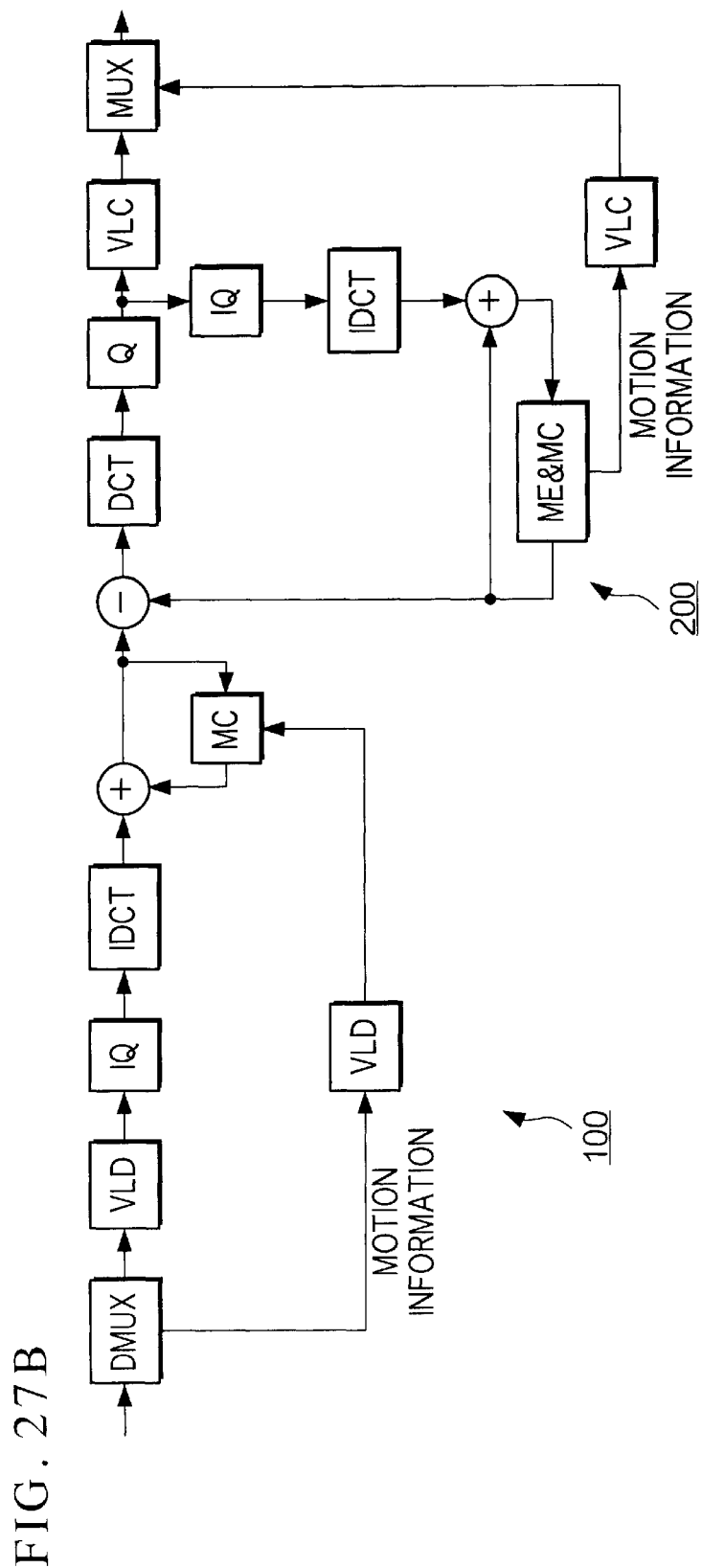

Here, the demultiplexing device 11 is a device which separates coded data corresponding to the frames aside from the I frame into a variable-length code which represents a DCT coefficient of a different image obtained by interframe prediction coding and a variable-length code of the motion information. The variable-length decoders 12 and 13 are devices for respectively returning the variable-length code of the DCT coefficient and the variable-length code of the motion information separated by the demultiplexing device 11 into quantized data of the DCT coefficient and motion information. The dequantizer 14 is a device for dequantizing the quantized data of the DCT coefficient obtained from the variable-length encoder 12 and outputting a DCT coefficient. The inverse DCT portion 15 is a device for performing an inverse DCT on the DCT coefficient obtained from the dequantizer 14, and determining a prediction error obtained by interframe prediction coding accompanying the motion compensation. This prediction error corresponds to a difference image obtained by subtraction of an image corresponding to the coded data and an image of the frame (first reference frame) referenced to generate the coded data while performing motion compensation during generation of coded data which is the object of processing. The frame memory 17 is a memory for storing decoded image data. When a prediction error (difference image) corresponding to a certain processing object frame is outputted from the inverse DCT portion 15 to the adder 16, the motion compensation portion 18 reads the image data of the first reference frame referenced at the time of generation of the coded data of this processing object frame from the frame memory 17, and in response thereto, performs motion compensation using motion information from the variable-length decoder 13 and outputs the result to the adder 16. The adder 16 adds image data of a motion-compensated reference frame and a prediction error from the inverse DCT portion 15, and outputs the result of the addition as image data corresponding to the processing object frame. The structure and operation of the decoder 10 as described above are as already explained with reference to FIG. 24B and FIG. 26.

Next, the encoder 20 comprises a subtractor 21, a DCT portion 22, a quantizer 23, a dequantizer 24, an inverse DCT portion 25, an adder 26, a frame memory 27, a motion compensation portion 28, variable-length encoders 29 and 30, and a multiplexer 31.

Here, the subtractor 21 is a device for calculating image data corresponding to a processing object frame supplied from the decoder 1 side and a prediction error which is the difference with respect to the motion-compensated reference image data supplied form the motion compensation portion 28. The reference image data shall be described below. The DCT portion 22 is a device for performing a DCT with respect to a prediction error obtained from the subtractor 21, and the quantizer 23 is a device for quantizing the DCT coefficient obtained from the DCT portion 22 and outputting the quantized data. The dequantizer 24 is a device for dequantizing the quantized data outputted from the quantizer 23 and outputting a DCT coefficient, and the inverse DCT portion 25 is a device for performing an inverse DCT on the DCT coefficient outputted from the dequantizer 24 to restore the prediction error. The frame memory 27 is a memory for storing image data of the reference frame. When image data corresponding to a certain processing object frame is supplied from the decoder 1 side to the subtractor 21, the motion compensation portion 28 reads image data corresponding to the reference frame referenced in the coding of the relevant processing object frame stored in the frame memory 27, and performs motion compensation with respect to this image data using motion information supplied from the motion information correcting portion 50 to be explained later. Then, reference image data obtained by this motion compensation is supplied to the subtractor 21 and adder 26. The adder 26 adds the motion-compensated reference image data and the prediction error obtained from the inverse DCT portion 25, and outputs image data corresponding to the original image data of the processing object frame. This image data is written into the frame memory 24 as image data of the reference frame referenced when coding the subsequent frames.

There is a large difference between the encoder 20 described above and the encoder in the conventional transcoding apparatus that has already been described. That is, the encoder of the conventional transcoding apparatus has a prediction and compensation portion 205 (see FIG. 24A), and this motion prediction and compensation portion 205 searches for motion information corresponding to movement from the reference frame to the processing object frame. In contrast, the encoder 20 of the present embodiment does not have such means for searching motion information. The encoder 20 in the present embodiment performs motion compensation of image data of the second reference frame using motion information sent from the motion information correcting portion 50. The characteristic of the present embodiment lies in the fact that this motion information is obtained with much less processing then in conventional apparatus. In the present embodiment, this motion information is obtained by the motion information calculating portion 40 and motion information correcting portion 50 in FIG. 11.

The motion information calculating portion 40 corresponds to the motion information calculating circuit 2 of the transcoding apparatus according to the first preferred embodiment of the present invention (see FIG. 2). The motion information calculating portion 40 is a device for calculating motion information to be included in the coded data after transcoding, by performing motion information calculation algorithm using motion information obtained from the variable-length decoder 13 of the decoder 10. For example, when performing the transcoding shown in FIG. 10A, taking the B frame immediately after the I frame as the processing object frame, the coded data corresponding to this processing object frame is generated by referencing the image data of the I frame and P frame (first reference frame), and includes motion information corresponding to motion from the I frame to the processing object frame and motion information corresponding to motion from the P frame to the processing object frame. Then, the transcoding converts coded data of this processing object frame to coded data referencing only the I frame (second reference frame). In order to obtain coded data referencing only this I frame (second reference frame), the motion information calculating portion 40 uses at least the motion information contained in the coded data of the processing object frame to calculate motion information corresponding to motion from the I frame (second reference frame) to the processing object frame. A number of appropriate types of this calculation algorithm for motion information are disclosed in the first preferred embodiment.

Next, the motion information correcting portion 50 shall be described. The motion information obtained from the motion information calculating portion 40 is not obtained by searching for the motion information, but by performing an operation on existing motion information. Therefore, there are cases in which the motion information that is obtained is not very accurate. Therefore, in the present embodiment, it is judged whether or not the motion information obtained from the motion information calculating portion 40 can be considered to be accurate, and if it is acknowledged to be accurate, the motion information is sent as is to the encoder 20. In contrast, when the motion information obtained from the motion information calculating portion 40 is found not to be accurate, an image close to the image of the processing object frame is found from among the image data of the second reference frame stored in the frame memory 17, and motion information corresponding to motion from the second reference frame to the processing object frame is determined. The motion information correcting portion 50 is means for handling this type of function. The specifics of the process for judging whether or not the motion information obtained from the motion information calculating portion 40 is accurate and the details of the process for finding motion information by searching shall be explained in the part concerning operation of the present embodiment in order to avoid redundancy of explanation.

Herebelow, the operations of the present embodiment shall be explained by giving examples for the case of transcoding as shown in FIG. 10A. The transcoding apparatus according to the present embodiment differs from the conventional transcoding apparatus by comprising a motion information calculating portion 40 and motion information correcting portion 50, and using motion information obtained thereby on the encoder 20 side. Accordingly, the operations of the motion information calculating portion 40 and motion information correcting portion 50 shall mainly be described below.

(1) Operation of Motion Information Calculating Portion 40

Figure 12:
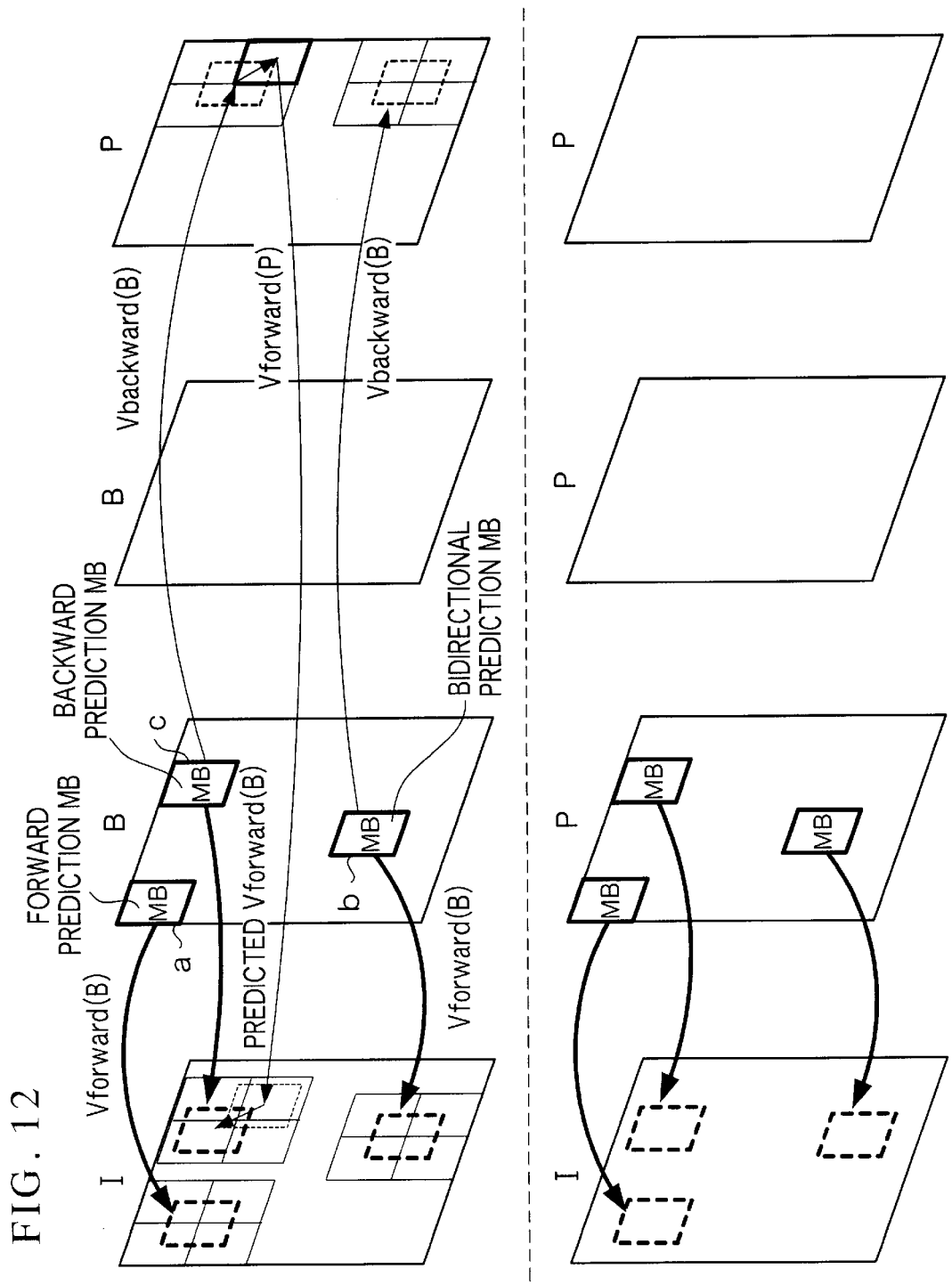
FIGS. 12–14 are diagrams showing the processing of a motion information calculating portion of the same embodiment.
Figure 13:
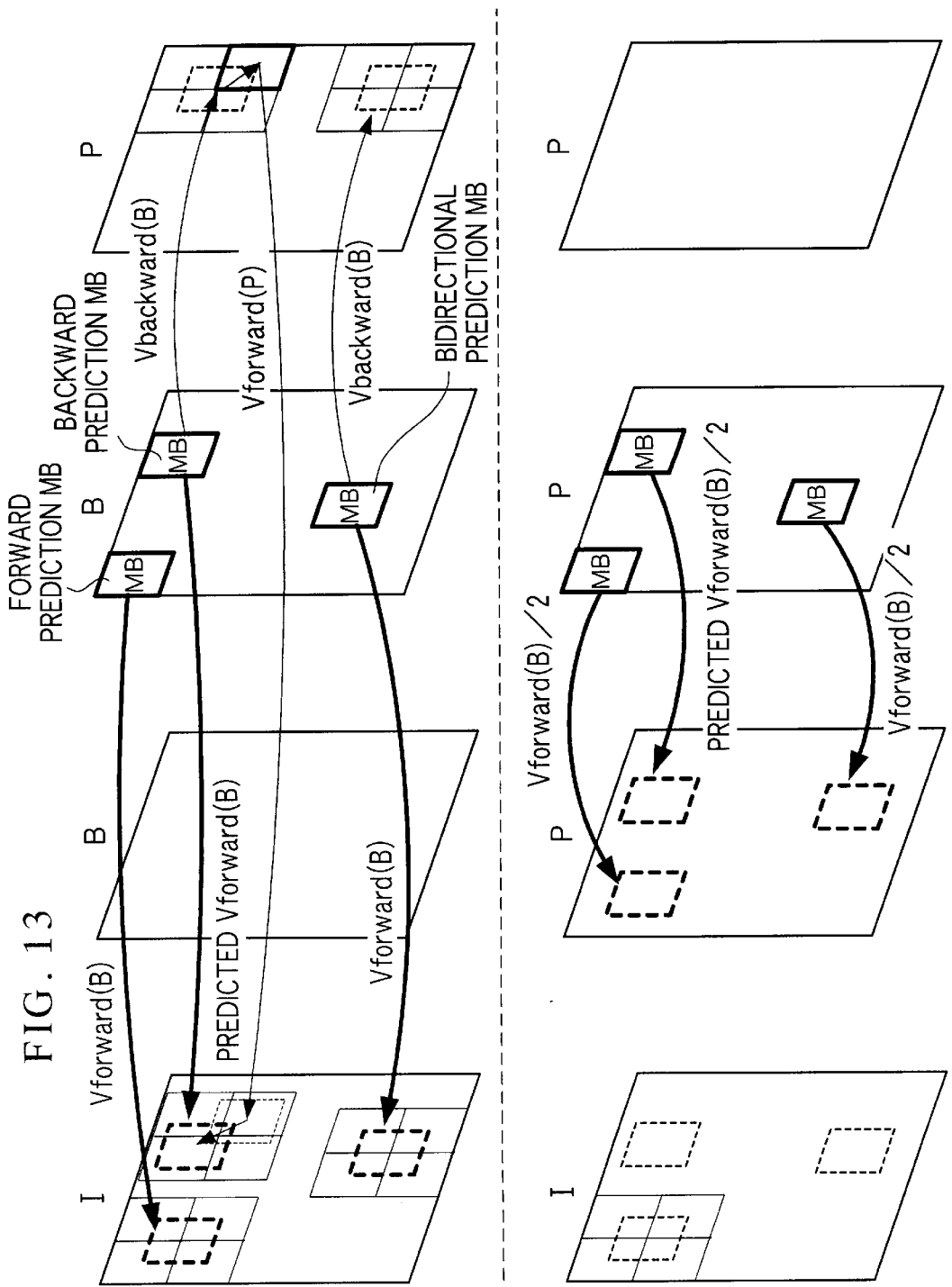
Figure 14:
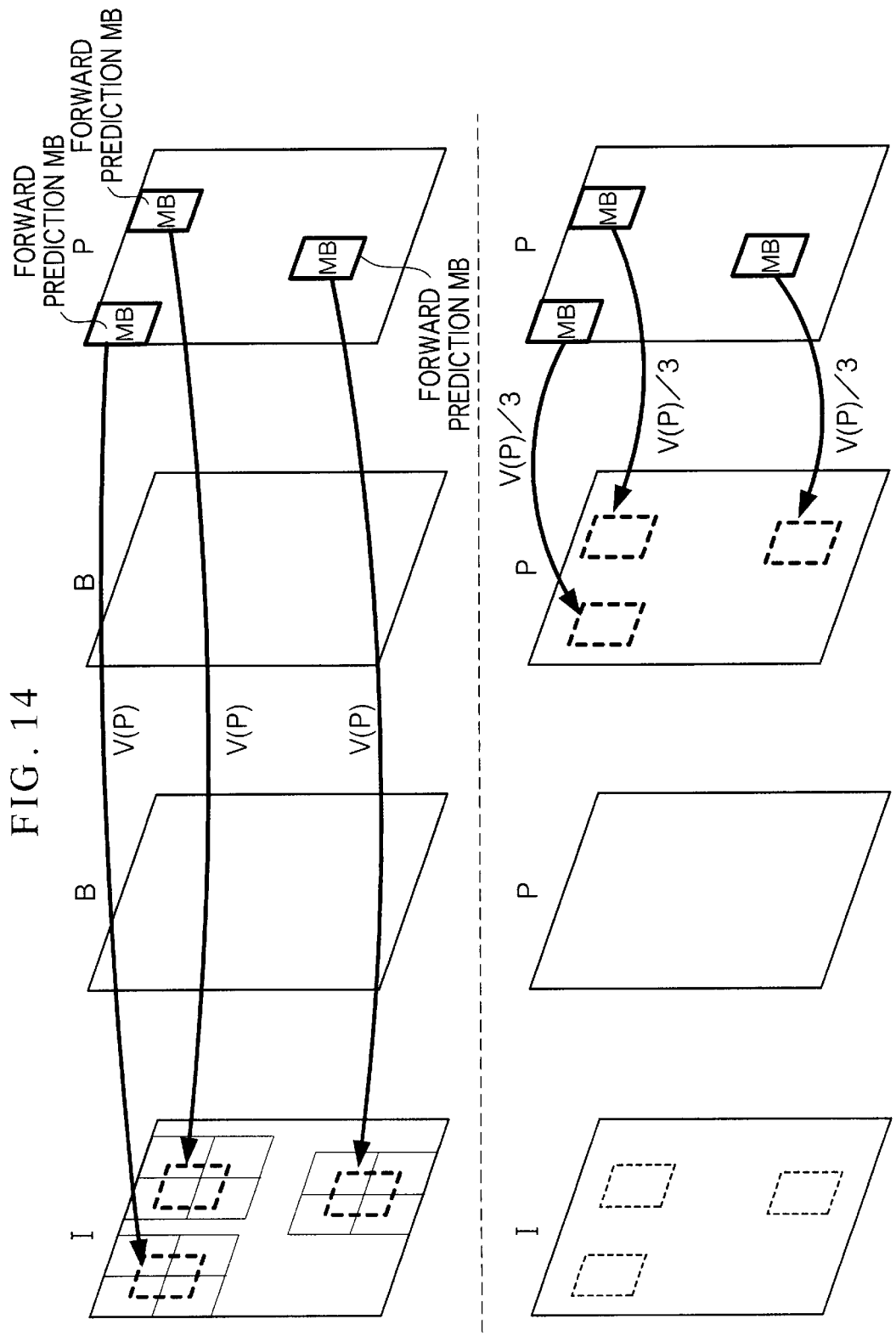

First, with reference to FIGS. 12–14, the operations of the motion information calculating portion 40 shall be explained for the case where transcoding is performed as per FIG. 10A.

In FIGS. 12–14, two B frames are inserted between the I frame and P frame prior to transcoding. The motion information calculating portion 40 performs the motion information calculation processes necessary to make these B frames (processing object frames) into P frames referencing only the immediately preceding frame (second reference frame), and the motion information calculating processes necessary to make the last P frame (processing object frame) into a P frame referencing only the immediately preceding P frame (which was originally a B frame).

<Processes Corresponding to B Frame Immediately After I Frame>

In the present embodiment, the following three types of macroblocks contained in the B frame are handled.

a. Macroblock which has been interframe prediction coded by a forward prediction mode. That is, a macroblock containing motion information referencing only the previous frame (in this example, the I frame) in the coded data.

b. Macroblock which has been interframe predication coded by a bidirectional prediction mode. That is, a macroblock containing motion information referencing a previous frame (in this example, the I frame) and motion information referencing a subsequent frame (in this example, the P frame) in the coded data.

c. Macroblock which has been interframe prediction coded by a backward prediction mode. That is a macroblock containing motion information referencing only a subsequent frame (in this example, the P frame) in the coded data.

This applies not only to the one immediately after the I frame, but also to the second B frame.

The motion information calculating portion 40 calculates motion information after transcoding corresponding to three types of macroblocks a–c in connection to the B frame immediately following the I frame.

First, with regard to the macroblock a, the motion information (forward) Vforward (B) separated from the coded data of that macroblock is taken as post-transcoding motion information as is. Next, with regard to the macroblock b, of the motion information separated from the coded data of that macroblock, only the motion information (forward) Vforward (B) referencing the previous frame is taken as the post-transcoding motion information, and motion information (backward) Vbackward (B) which references the subsequent frame is disposed of.

Figure 15:
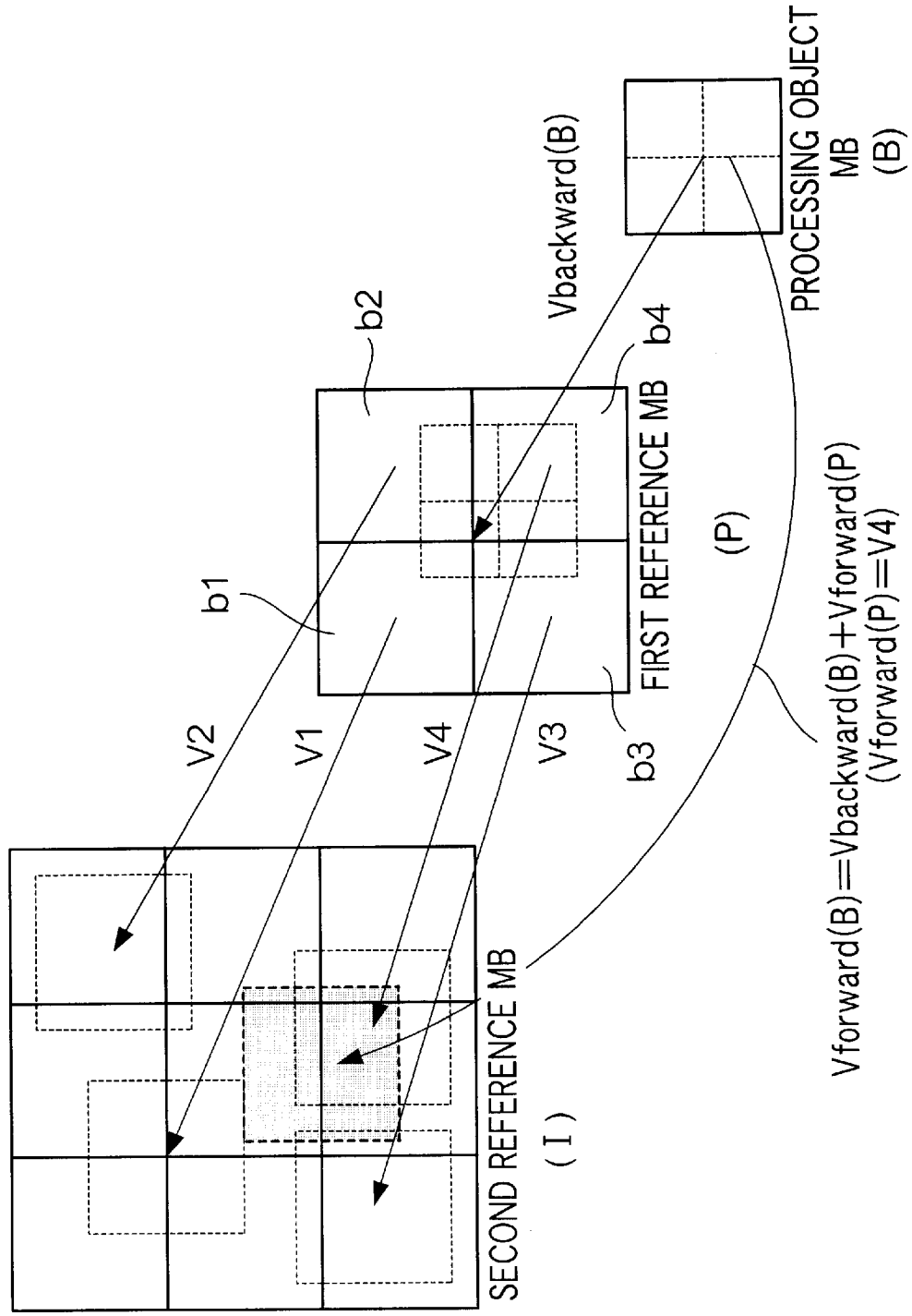
FIG. 15 is a diagram showing an example of the motion information calculating algorithm of the motion information calculating portion.

Next, with regard to the macroblock c, the coded data corresponding to this macroblock c contains only motion information Vbackward (B) for motion compensation with respect to the P frame (first reference frame), and does not contain motion information for motion compensation with respect to the I frame (second reference frame) which is the referencing destination after transcoding. On the other hand, the coded data of the macroblocks constituting the P frame (first reference frame) contains motion information Vforward (P) for motion compensation with respect to the I frame (second reference frame). Therefore, the motion information calculating portion 40 determines a predicted value of motion information for motion compensation between the macroblock c and the I frame (second reference frame) by operations using the motion information Vbackward (B) and Vforward (P). Here, an example of a method for calculating a predicted value of this motion information shall be given with reference to FIG. 15.

Step 1: First, motion information Vbackward (B) separated from the coded data of the marcroblock c which is the processing object is acquired. This motion information Vbackward (B) corresponds to motion from the macroblock (first reference macroblock) corresponding to the processing object macroblock c contained in the P frame (first reference frame) to the processing object macroblock c.

Step 2: A first reference macroblock corresponding to the macroblock c in the P frame (first reference frame) is determined from the motion information Vbackward (B).

Step 3: The motion information Vforward (P) corresponding to the macroblock of which the area of the portion overlapping the first reference macroblock is largest of the macroblocks in the P frame (first reference frame) is determined. In the example shown in FIG. 15, the first reference macroblock covers the macroblocks b1–b4, of which the area of the portion overlapping macroblock b4 is the largest. Therefore, the motion information V4 corresponding to this macroblock b4 is selected as the motion information Vforward (P).

Step 4: From the above-mentioned information Vbackward (B) and Vforward (P), the predicted motion information Vforward (B) after transcoding of the macroblock c is calculated.

$$\text{Predicted } V\text{forward } (B) = V\text{forward } (B) + V\text{backward } (P) \quad (12)$$

The above gives the details on the post-transcoding motion information calculating method corresponding to the B frame immediately following the I frame.

<Process Corresponding to Second B Frame>

Next, with reference to FIG. 13, the processing for the second B frame shall be described. This second B frame, like the B frame immediately after the I frame, also includes the three above-described types of macroblocks a–c. Additionally, when comparing the time difference between the second B frame which is the processing object frame and the first reference frame (I frame) which is the reference prior to transcoding thereof, and the time difference between that processing object frame and the second reference frame (B frame immediately after the I frame) which is the reference after the transcoding thereof, the latter is ½ of the former. Therefore, the motion information calculating portion 40 calculates the post-transcoding motion information corresponding to the three types of macroblock a–c by linear interpolation in the following way.

First, with respect to this macroblock a, motion information (forward direction) Vforward (B) separated from the coded data of that macroblock is acquired and Vforward (B)/2 is taken as the post-transcoding motion information. Next, with respect to the macroblock b, of the motion information separated from the coded data of that macroblock, the motion information (forward) Vforward (B) referencing the previous frame is acquired, and Vforward (B)/2 is taken as the post-transcoding motion information. Next, with respect to the macroblock c, predicted motion information Vforward (B) for motion compensation between that macroblock c and the corresponding macroblock in that I frame (second reference frame) is determined, and Vforward (B)/2 is taken as the post-transcoding motion information. The above is the method for calculating post-transcoding motion information corresponding to the second B frame. When the motion of the image is comparatively smooth, it is believed to be possible to obtain predicted values for motion information which are comparatively close to those obtained by motion information searching, even by means of linear interpolation of this type.

<Process Corresponding to Last P Frame>

Next, the process for the final P frame shall be explained with reference to FIG. 14. For the macroblocks constituting this P frame, all coded data are generated by referencing the leading I frame (first reference frame). Additionally, when comparing the time difference between the P frame which is the processing object frame and the first reference frame (I frame) which is referenced prior to the transcoding thereof, and the time difference between the processing object frame and the second reference frame (second B frame) which is referenced after the transcoding thereof, the latter is ⅓ of the former. Therefore, the motion information calculating portion 40 calculates the post-transcoding motion information in the processing object frame by the following linear interpolation. That is, with regard to each macroblock, the motion information (forward) Vforward (P) separated from the coded data of that macroblock is acquired, and Vforward (P)/3 is taken as the motion information after transcoding. The above are the details of the method for calculating post-transcoding motion information with respect to the last P frame.

(2) Operation of Motion Information Correcting Portion 50

Figure 16:
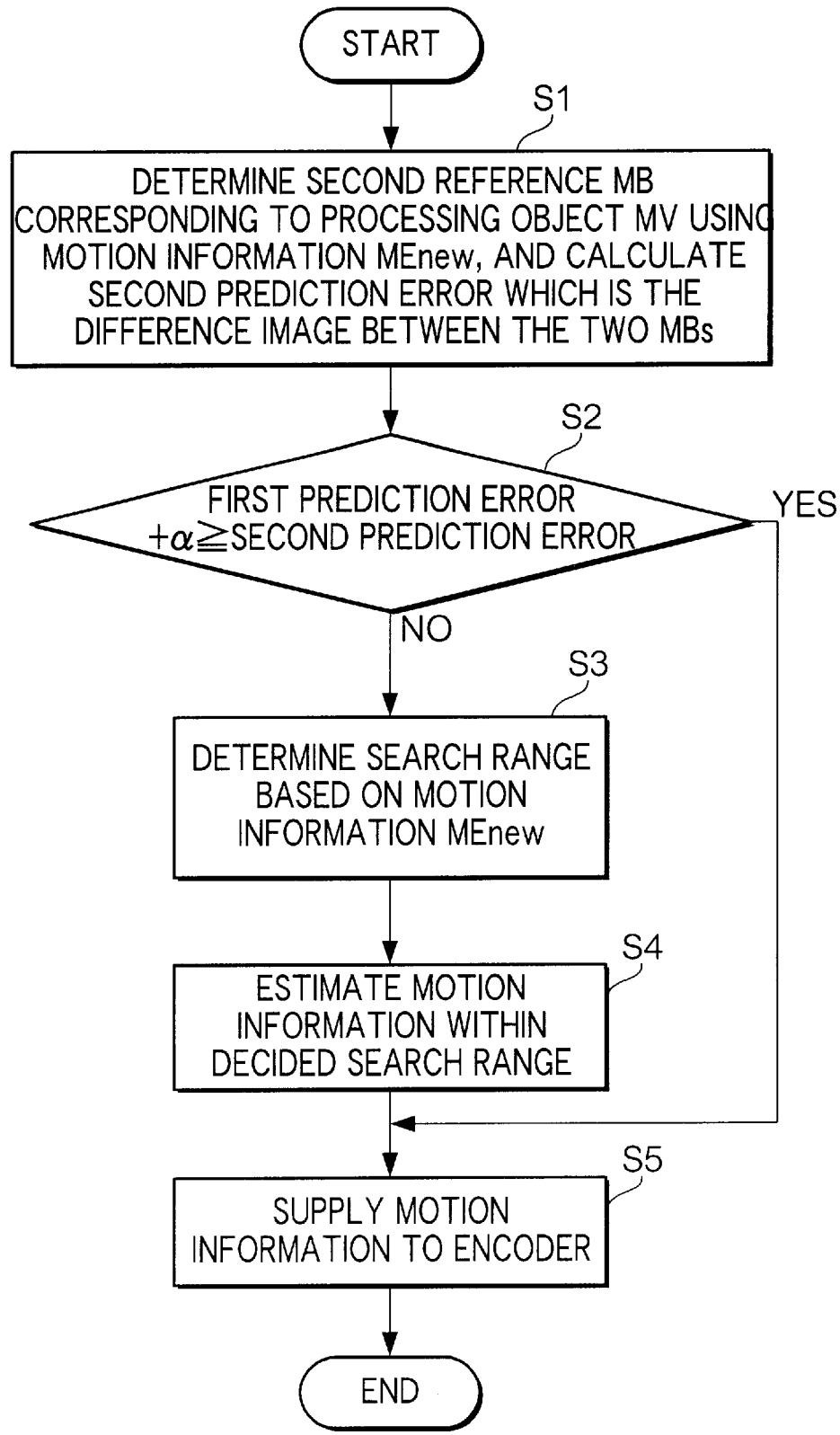
FIG. 16 is a flow chart showing the operations of the motion information correcting portion in the same embodiment.

Since the motion information obtained from the motion information calculating portion 40 reuses already existing motion information as explained above or performs predetermined operations on already existing motion information, there are cases in which the motion information which is obtained is not very accurate. The motion information correcting portion 50 judges whether or not the motion information obtained by this motion information calculating portion 40 can be considered to be accurate, and if found not to be accurate, generates motion information to replace it which is supplied to the encoder 20. FIG. 16 is a flow chart showing the operation of this motion information correcting portion 50. The motion information correcting portion 50 performs the processes shown in this flow chart for each processing object macroblock constituting the processing object frame.

First, the motion information correcting portion 50 uses motion information (hereinafter referred to as motion information MEnew) calculated by the motion information calculating portion 40 to determine the position in the frame of the second reference macroblock which corresponds to the processing object macroblock, and reads image data corresponding to this second macroblock from the frame memory 17. Next, the motion information correcting portion 50 subtracts image data corresponding to the second reference macroblock from the image data of the processing object macroblock obtained from the adder 16, and calculates a prediction error (hereafter referred to as the second prediction error) (this completes step S1).

Next, the motion information correcting portion 50 acquires a prediction error (difference image between the processing object macroblock and the first reference macroblock) corresponding to the processing object macroblock outputted from the inverse DCT portion 15, and judges whether or not the conditions of the following equation are satisfied (step S2).

$$\text{First Prediction error} + a \geq \text{Second Prediction error} \quad (13)$$

Here, a is a predetermined constant.

If the conditions of the above equation (13) are satisfied, the motion information correcting portion 50 assumes the motion information MEnew to be accurate motion information, and sends the motion information MEnew to the encoder 2 as motion information corresponding to motion from the second reference macroblock to the processing object block (step S5).

On the other hand, if the conditions indicated in the above equation (13) are not satisfied, then the motion information correcting portion 50 assumes the motion information MEnew to be inaccurate motion information, decides on the searching range of the motion information based on the motion information MEnew (step S3), and searches for accurate motion information to replace the motion information MEnew within this searching range (step S4).

Herebelow, these processes shall be described with reference to FIGS. 17–19.

Figure 17:
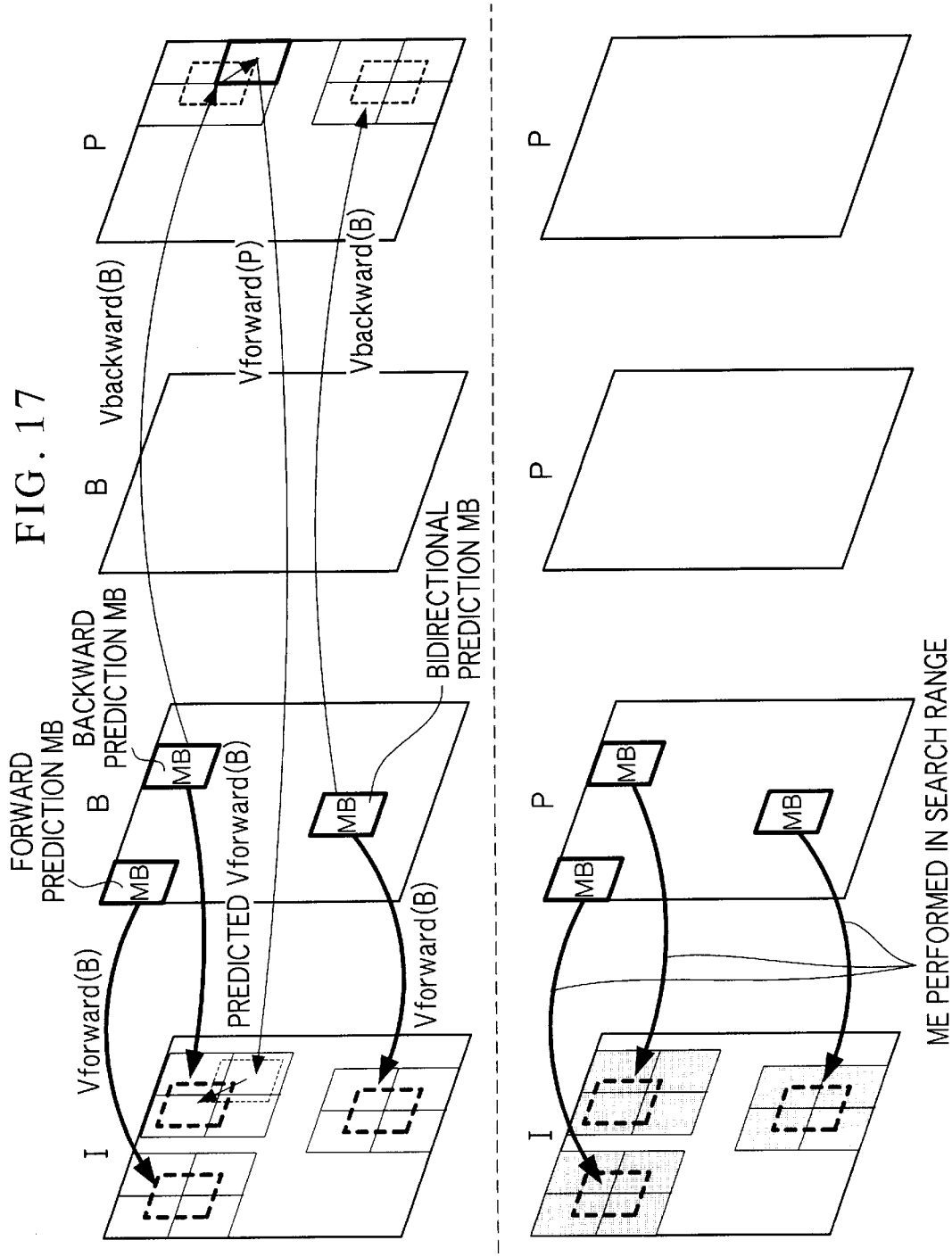
FIGS. 17–19 are diagrams for explaining a motion information searching process of a motion information correcting portion in the same embodiment.

First, FIG. 17 is for explaining the method for deciding the searching range of motion information for the case where a macroblock contained in the B frame immediately after the I frame is the processing object macroblock when performing transcoding as shown in FIG. 10A.

Here, in the case of the B frame immediately after the I frame, the second reference frame which is referenced after transcoding becomes the I frame. Therefore, the motion information correcting portion 50 uses motion information (Vforward (B) in FIG. 17) calculated by the motion information calculating portion 40 to determine the position of the second reference macroblock corresponding to the processing object macroblock. In FIG. 17, this second reference macroblock is indicated by a dashed line inside the box representing the I frame. The motion information correcting portion 50 finds four macroblocks having portions overlapping the second reference macroblock from among the macroblocks constituting the I frame which is the second reference frame. These four macroblocks are the range of searching of the motion information corresponding to the processing object macroblock.

When the range of searching of the motion information is determined in this way, the motion information correcting portion 50 searches among the images corresponding to the second reference frame (I frame) within the searching range wherein the prediction error with respect to the image of the processing object macroblock is smallest. Then, it determines motion information corresponding to motion from the reference image obtained by the search to the processing object macroblock.

Figure 18:
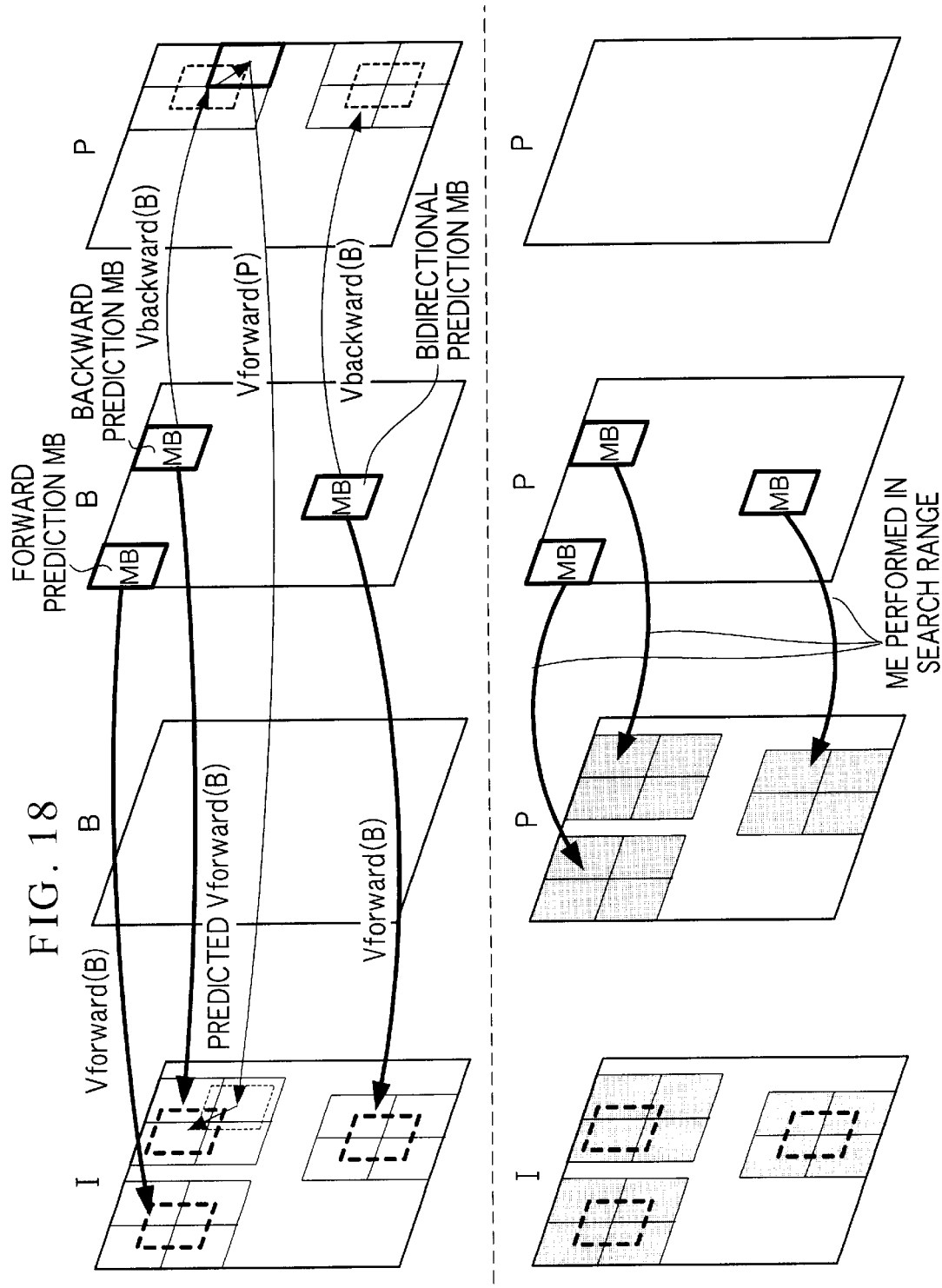
Figure 19:
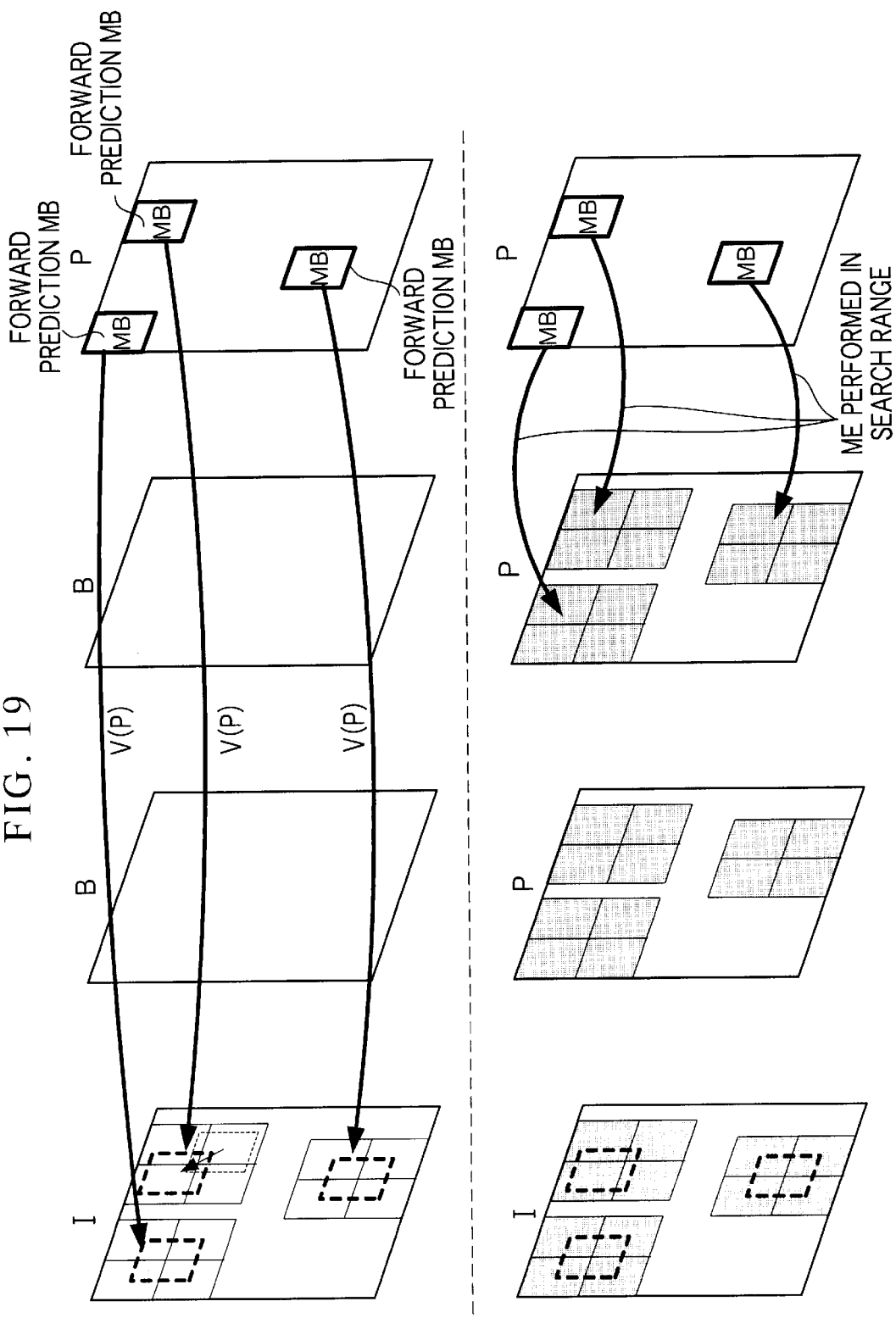

Next, FIG. 18 is for explaining a method for deciding the range of searching of the motion information when a macroblock contained in the second B frame is the processing object macroblock when performing the transcoding shown in FIG. 10A. Additionally, FIG. 19 is for explaining the method for deciding the range of the search for motion information when the macroblock contained in the last P frame is the processing object macroblock. The operations of the motion information correcting portion 50 in these cases is similar to the case of the B frame immediately following the I frame which has been described above. That is, the motion information correcting portion 50 finds the macroblocks which overlap with the second reference macroblock from among the macroblocks constituting the second reference frame immediately before the processing object frame, and searches for motion information with these macroblocks as the search range.

The above is the processing of the motion information correcting portion 50 corresponding to steps S3 and S4 in FIG. 16. The motion information correcting portion 50 sends the motion information obtained in this way to the encoder 20 as motion information corresponding to motion from the second reference macroblock to the processing object block (step S5).

(3) Operation of Encoder 20

The encoder 20 is supplied with image data of the macroblocks (processing object macroblocks) of the processing object frame outputted from the decoder 10, and motion information corresponding to the processing object macroblocks outputted by the motion information correcting portion 50. Then, the motion compensation portion 28 in the encoder 10 uses the motion information corresponding to the processing object macroblocks received from the motion information correcting portion to determine the positions of the respective second reference macroblocks corresponding to the processing object macroblocks. Then, it reads image data of these second reference macroblocks corresponding to processing object macroblocks from the frame memory 27 and sends them to the subtractor 21.

The subtractor 21 subtracts the image data of the second reference macroblocks from the image data of the respectively corresponding processing object macroblocks, and outputs the results as prediction errors. These prediction errors are converted into DCT coefficients by the DCT portion 22, and formed into quantized data by the quantizer 23. This quantized data is restored to prediction errors by passing through the dequantizer 24 and the inverse DCT portion 25. The adder 26 adds the image data of the second reference macroblocks outputted from the motion compensation portion 28 with the prediction errors, and writes the results into the frame memory 27 as image data corresponding to the processing object macroblocks.

On the other hand, the quantized data outputted from the quantizer 23 is variable-length coded by the variable-length encoder 29. Additionally, the motion information from the motion information correcting portion 50 is variable-length coded by the variable-length encoder 30. These variable-length codes are multiplexed by the multiplexer 31, and outputted as post-transcoding coded data corresponding to the processing object frame.

Thus, according to the present embodiment, motion information searching is not performed on the encoder 2 side, and the amount of processing to search for motion information during transcoding is reduced, thus enabling the efficiency of transcoding to be considerably increased.

B-3. Operational Examples for Other Types of Transcoding

In the embodiment described above, an example of a case of transcoding as shown in FIG. 1A has been given, but here, operational examples for cases in which other types of transcoding are performed shall be described.

Figure 20:
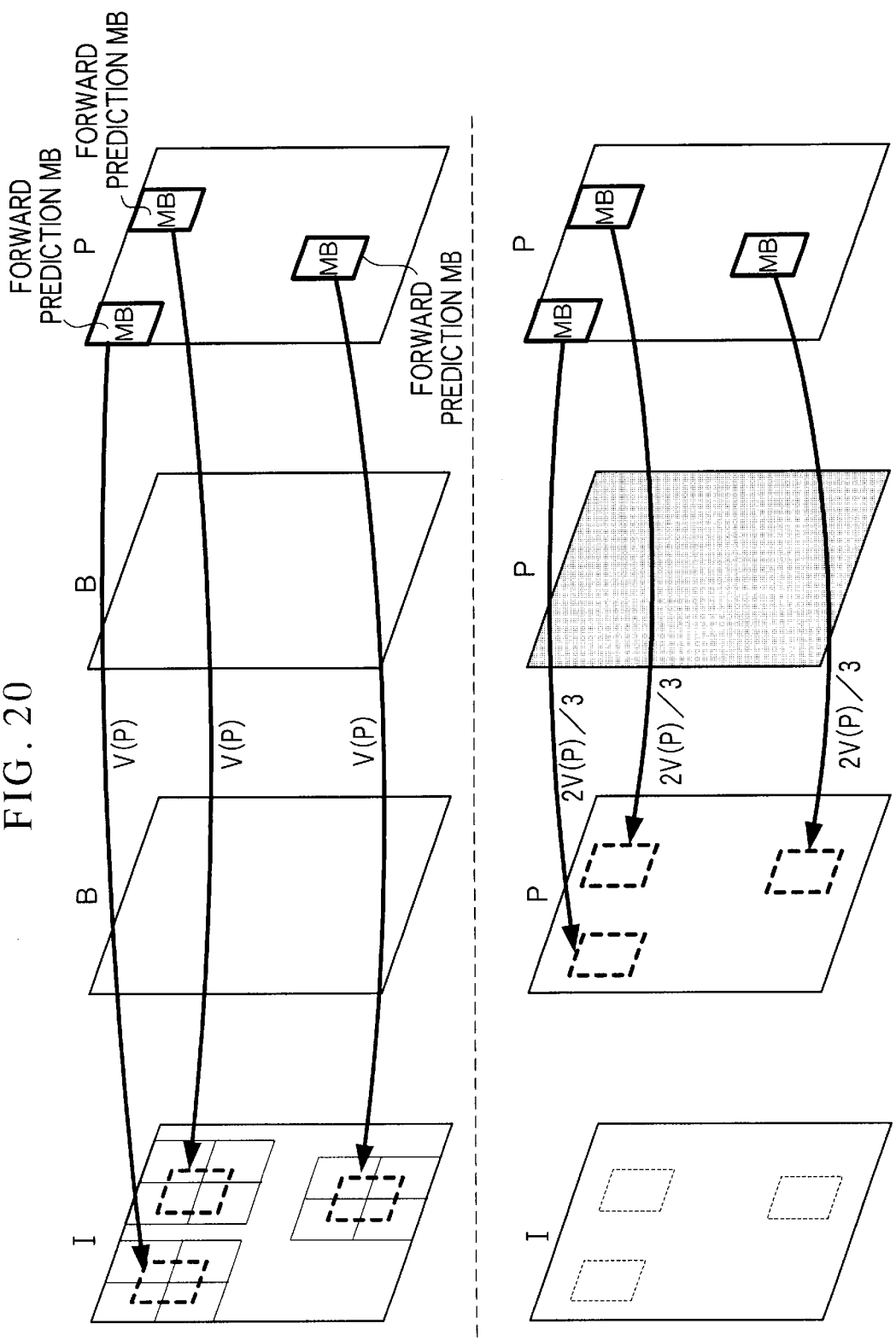
FIGS. 20–22 are diagrams showing an operational example of transcoding with discard of frames in the same embodiment.

First, the operations of the motion information calculating portion 40 for the case where transcoding is performed as shown in FIG. 10B shall be described with reference to FIG. 20. In FIG. 20, the method for calculating post-transcoding motion information of the B frame immediately after the I frame is as explained in the above-described embodiments. Next, the second B frame in FIG. 20 is discarded during transcoding.

Then, the post-transcoding motion information of the last P frame of the picture group is determined in the following way. First, as shown in FIG. 20, a P frame which had taken the I frame as a reference frame prior to transcoding becomes a frame referencing the P frame (formerly a B frame) immediately following the I frame after transcoding. Here, when comparing the time difference between the I frame and the P frame with the time difference between the P frame immediately following the I frame and the last P frame before transcoding, the latte is ⅔ of the former. Therefore, the motion information calculating portion 40 acquires the motion information V(P) corresponding to the macroblocks of the last P frame, and takes 2V(P)/3 as the post-transcoding motion information.

Figure 21:
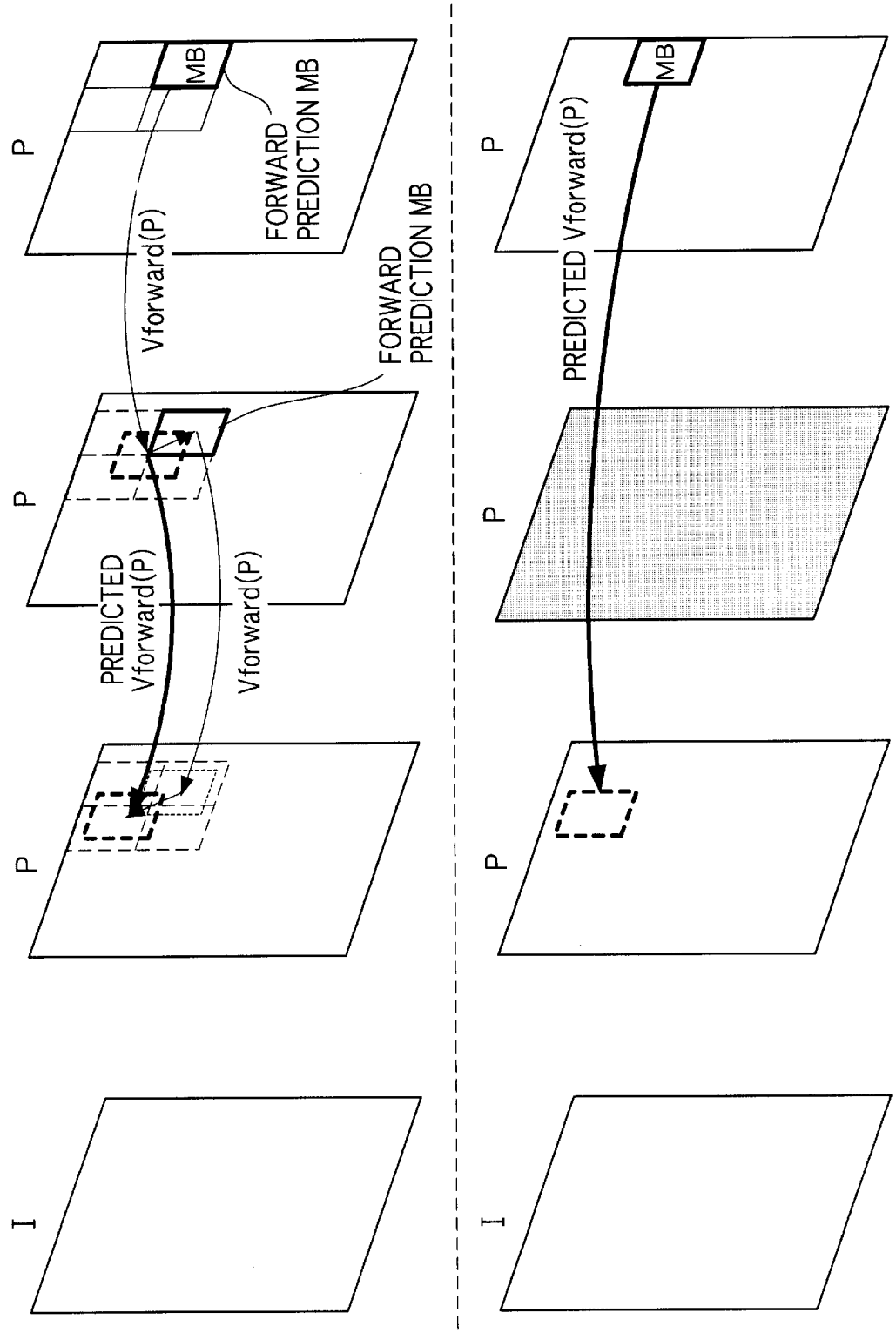

Next, the operations of the motion information calculating portion 40 for the case where transcoding is performed as shown in FIG. 10C shall be described with reference to FIG. 21. In FIG. 21, the P frame immediately following the I frame does not change the frame which it references before and after transcoding. Therefore, this P frame is not processed by the motion information calculating portion 40. The second P frame is discarded during transcoding. Accordingly, the second P frame also is not processed by the motion information calculating portion 40.

Next, the last P frame of the picture group, in the first reference frame which is referenced before transcoding, is the second P frame, but in the second reference frame which is referenced after transcoding, is the first P frame immediately after the I frame. Therefore, the motion information calculating portion 40 calculates a predicted value Vforward (P) corresponding to motion between the second reference frame and the processing object frame for each processing object macroblock constituting the final P frame which is the processing object frame, according to the following procedure.

Step 1: First, a first reference macroblock corresponding to the processing object macroblock in the first reference frame (second P frame) is determined using motion information Vforward (P) corresponding to the processing object macroblock in the final P frame.

Step 2: Next, the motion information Vforward (P) corresponding to the macroblock of which the area of the portion overlapping with the first reference macroblock is largest among the macroblocks in the first reference frame is determined, and this motion information Vforward (P) and the motion information Vforward (P) determined in the above-described step 1 are added. As a result, a predicted value Vforward (P) for motion information corresponding to motion between the second reference frame (first P frame) and the processing object frame is obtained.

Figure 22:
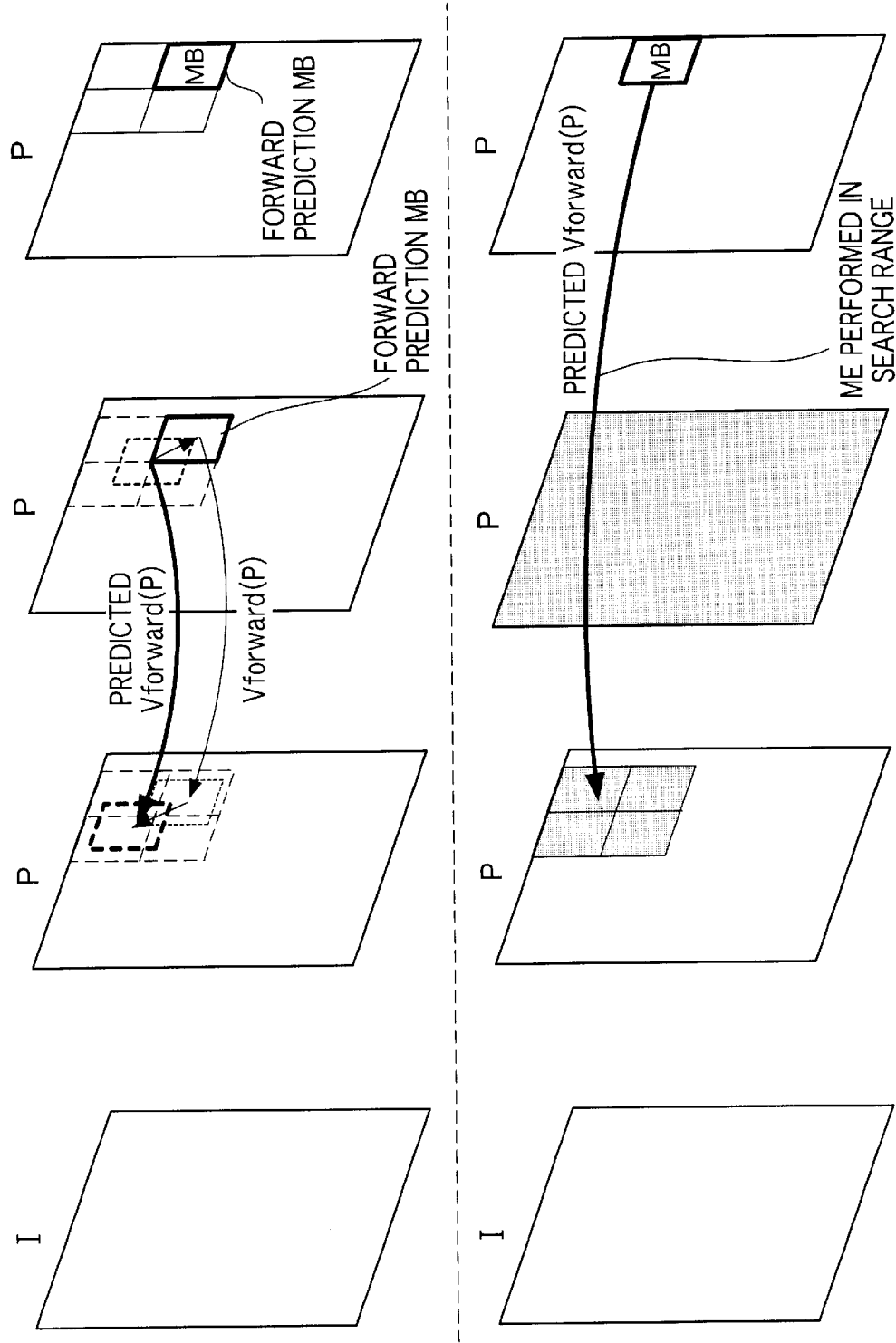

The above gives the operations of the motion information calculating portion 40 in the case of transcoding with discard of frames such as shown by way of example in FIGS. 10B and 10C. The operations of the motion information correcting portion 50 and other portions do not differ from those in the above-described embodiments. FIG. 22 shows a method of deciding the range of searching when the motion information corresponding to the processing object macroblock in the last P frame calculated by the motion information calculating portion 40 is inaccurate and the motion information correcting portion 50 searches for motion information, for the case of transcoding as shown in FIG. 1C. As shown in the drawing, the motion information correcting portion 50 determines the second reference macroblock in the second reference frame (first P frame) using motion information calculated by the motion information calculating portion 40, and searches for motion information by taking as the search range the macroblocks in the second reference frame overlapping this second reference macroblock.

B-4. Modification

In the embodiments described above, the concept of frames in picture groups was used, but the present invention is not restricted to use with frames, and is just as applicable to coding formats such as MPEG-2 which handle fields. For example, in the case of a television signal, as shown in FIG. 8, a single frame is composed of two fields. Then, interframe prediction coding is performed between the odd fields and between the even fields of adjacent frames. In the case of transcoding of coded data obtained by interframe prediction coding such as this, it is possible to calculate and correct motion information by the same basic procedures as those outlined for the above-described embodiments. That is, it is sufficient simply to take each field in a frame as a processing object frame, and to calculate and correct the motion information as per the above-described embodiments.

C. Third Preferred Embodiment

Figure 23:
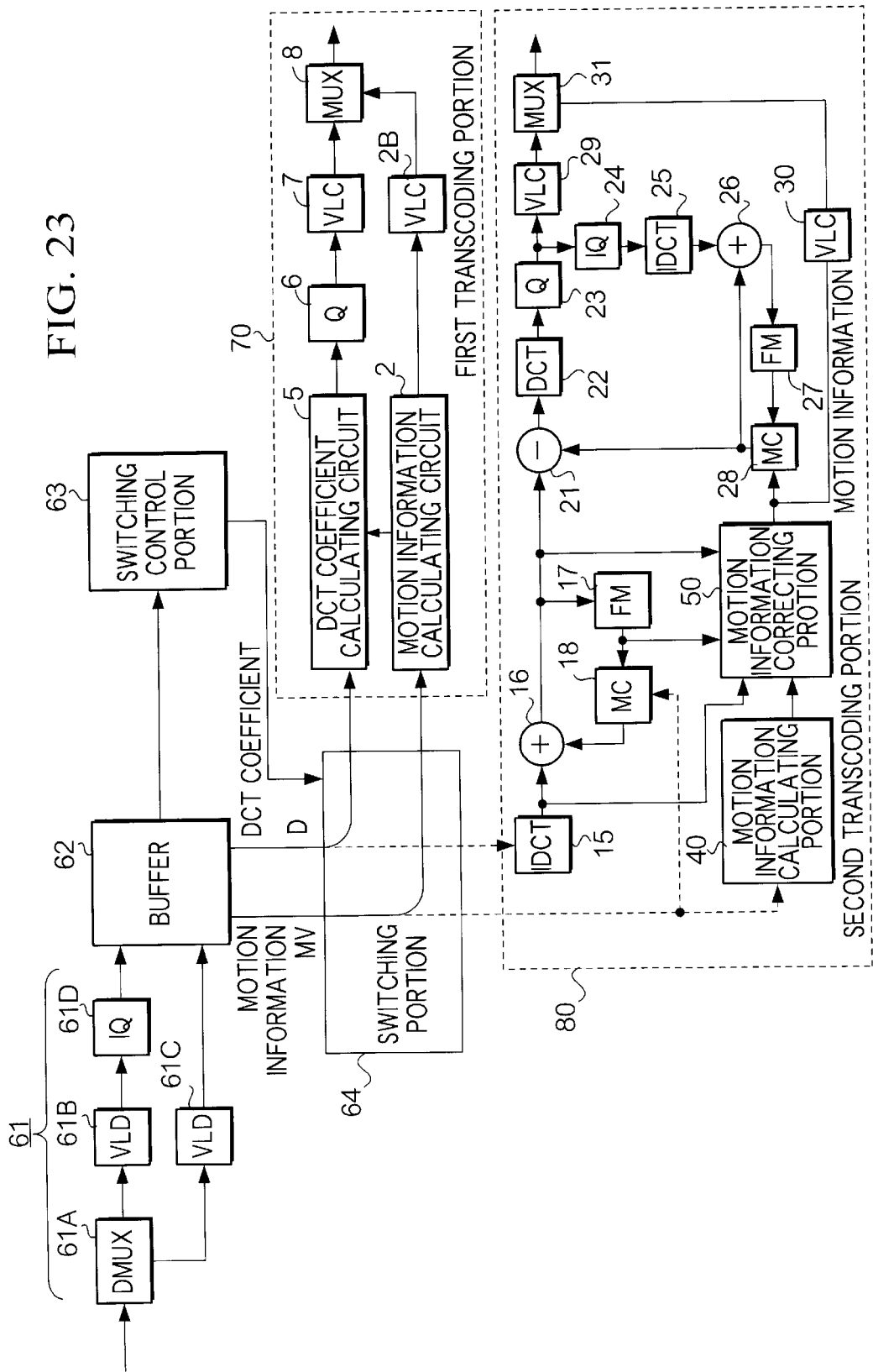
FIG. 23 is a block diagram showing a transcoding apparatus according to the third preferred embodiment of the present invention.
Figure 25:
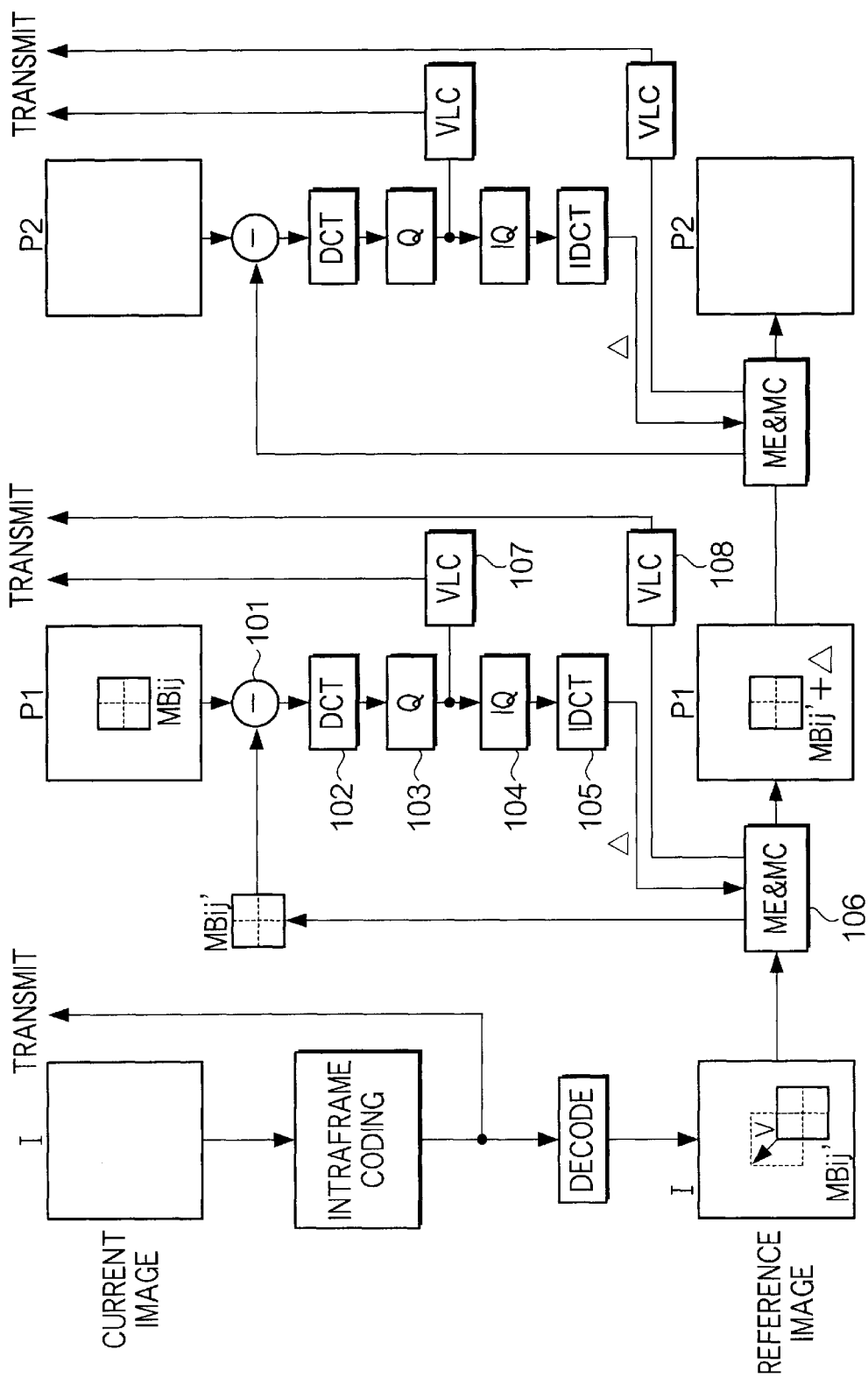
FIG. 25 is a diagram showing an example of operation of the above-mentioned encoder.

FIG. 23 is a block diagram showing the configuration of a transcoding apparatus according to a third preferred embodiment of the present invention.

As shown in FIG. 23, the transcoding apparatus has an input portion 61, buffer 62, a switching control portion 63, a switching portion 64, a first transcoding portion 70 and a second transcoding portion 80.

The input portion 61 has a demultiplexer 61A, a variable-length decoders 61B and 61C and a dequantizer 61D.

Here, the demultiplexer 61A is a device which separates coded data corresponding to the frames aside from the I frame into a variable-length code which represents a DCT coefficient of a different image obtained by interframe prediction coding and a variable-length code of the motion information. The variable-length decoders 61B and 61C are devices for respectively returning the variable-length code of the DCT coefficient and the variable-length code of the motion information separated by the demultiplexer 61A into quantized data of the DCT coefficient and motion information. The dequantizer 61D is a device for dequantizing the quantized data of the DCT coefficient obtained from the variable-length encoder 61B and outputting a DCT coefficient.

The buffer 62 receives the motion information from the variable-length decoder 61C and the DCT coefficient from the dequantizer 61D, and stores the motion information and DCT coefficient corresponding to a predetermined number of most recent frames. The predetermined number of most resent frame is a picture group, for example. When the storing of the motion information and DCT coefficient corresponding to a picture group has been completed, the motion information and DCT coefficient thus stored are then read out from the buffer 62 and the storing of the motion information and DCT coefficient corresponding to the next picture group starts.

The switching control portion 63 monitors the motion information stored in the buffer 62, and judges based on the motion information whether or not the motion of the video image is quick, and control the switching portion 64 based on the judgement.

The switching portion 64, under the control of the switching control portion 64, transmits the DCT coefficient and the motion information corresponding to the predetermined number of frames from the buffer 62 to the first transcoding portion 70 or to the second transcoding portion 80.

The first transcoding portion 70 is a device for performing the transcoding according to the method disclosed in the first preferred embodiment. Therefore, the first transcoding portion 70 has the elements which are included in the transcoding apparatus according to the first preferred embodiment (see FIG. 2).

The second transcoding portion 80 is a device for performing the transcoding according to the method disclosed in the second preferred embodiment. Therefore, the second transcoding portion 80 has the elements which are included in the transcoding apparatus according to the second preferred embodiment (see FIG. 11).

Next, the operation of the present embodiment will be described.

Coded data of frames of video image are sequentially supplied to the transcoding apparatus, and the DCT coefficient and the motion information corresponding to a predetermined number of most recent frames are stored in the buffer 62.

When the motion information stored in the buffer 62 is less than a predetermined threshold (which indicates that the motion of the video image is slow), the switching section 63 controls the switching portion 64 so that the DCT coefficient and the motion information are transmitted from the buffer 62 to the DCT coefficient calculating circuit 5 and the motion information calculating circuit 2 in the first transcoding portion 70. As a result, the transcoding disclosed in the first preferred embodiment is performed on the DCT coefficient and the motion information of the video image with a small calculation amount.

In contrast, when the motion information stored in the buffer 62 is more than the threshold (which indicates that the motion of the video image is quick), it is difficult for the motion information calculating circuit 2 to calculate accurate motion information and it makes a disadvantage that the amount of the coded data obtained by the transcoding is increased. In this case, therefore, the switching control portion 63 controls the switching portion 64 so that the DCT coefficient and the motion information are transmitted from the buffer 62 to the inverse DCT portion 15 and the motion information calculating portion 40 in the second transcoding portion 80. As a result, the transcoding disclosed in the second preferred embodiment is performed on the DCT coefficient and the motion information of the video image.

In the third preferred embodiment described above, the switching control of the switching portion 64 was performed in units of a predetermined number of frames such as a picture group. However, the method of the switching control is not restricted in the manner as described above. The number of frames by which the switching control is performed may not be constant.

D. Modification

In the embodiments described above, the concept of picture groups having a predetermined number of frames was used, but the present invention is not restricted to use with picture groups, and is just as applicable to coding formats such as MPEG-4 which does not have the concept of picture groups.

What is claimed is:

1. A transcoding method for converting first coded data obtained from a plurality of frames forming a video image by means of a coding algorithms including an interframe prediction coding algorithm with motion compensation into second coded data having a different structure, the transcoding method characterized by comprising:
    an interframe prediction coded data re-editing step of taking a portion of frames which have had the interframe prediction coding and are included in the plurality of frames forming the video image as processing object frames, and from at least the first coded data corresponding to the processing object frames, generating the second coded data corresponding to coded data which are to be obtained when performing the interframe prediction coding on the processing object frames with reference to second reference frames which are different from first reference frames referenced in the interframe prediction coding of the processing object frames;
    said interframe prediction coded data re-editing step including a motion information calculating step of calculating motion information to be included in said second coded data using at least motion information contained in said processing object data.

2. A transcoding method as recited in claim 1, wherein
    the interframe prediction coded data re-editing step is such as to take a portion of frames which have had the interframe prediction coding as the first reference frames, and take frames which have had the interframe prediction coding with reference to the first reference frames as the processing object frames, and take frames referenced in the interframe prediction coding of the first reference frames as the second reference frames, and generate the second coded data from processing object coded data which are the first coded data corresponding to the processing object frames and first reference coded data which are the first coded data corresponding to the first reference frames; and
    said motion information calculating step is such as to calculate the motion information to be included in said second coded data from motion information contained in said processing object data and motion information contained in said first reference coded data.

3. A transcoding method as recited in claim 2, characterized by comprising an discard step of omitting first coded data corresponding to a portion of the frames from the first coded data corresponding to the plurality of frames forming said video image;
    said interframe prediction coded data re-editing step being such as to take a frame corresponding to the discarded first coded data as the first reference frame, a frame on which interframe prediction coding has been performed with reference to the first reference frame as the processing object frame, and a frame referenced in the interframe prediction coding of the first reference frame as the second reference frame, to generate the second coded data.

4. A transcoding method as recited in claim 2, characterized in that in said motion information calculating step, each macroblock forming a processing object frame is taken as a processing object macroblock, and with respect to each processing object macroblock,
    a. determining motion information corresponding to said processing object macroblock from said processing object coded data;
    b. determining from said motion information a position of a predicted macroblock corresponding to said processing object macroblock in said first reference frame;
    c. determining motion information corresponding to the macroblock of which the area of the portion overlapping said predicted macroblcok is largest among the macroblocks in said first reference frame; and
    d. calculating, from the motion information of the above steps a and c, motion information for motion compensation between the second reference frame and the processing object frame.

5. A transcoding method as recited in claim 2, characterized in that, in said motion information calculating step, each macroblock forming the processing object frame is taken as a processing object macroblock, blocks divided from these processing object macroblocks are taken as processing object blocks, and with respect to each processing object macroblock,
    a. determining motion information corresponding to said processing object macroblock from said processing object coded data;
    b. determining from said motion information a position of a predicted macroblock corresponding to said processing object macroblock in said first reference frame;
    c. determining, for each of the plurality of first reference blocks divided from said predicted macroblock, motion information corresponding to the macroblock of which the area of the portion overlapping with said first reference block is largest among the macroblocks in said first reference frame; and
    d. calculating, from the motion information of the above step a and the motion information determined for each of the plurality of first reference blocks in the above step c, motion information for motion compensation between the second reference frame and the processing object frame.

6. A transcoding method as recited in claim 2, characterized in that, in said motion information calculating step, each macroblock forming the processing object frame is taken as a processing object macroblock, and with respect to each processing object macroblock,
    a. determining motion information corresponding to said processing object macroblock from said processing object coded data;
    b. determining from said motion information a position of a predicted macroblock corresponding to said processing object macroblock in said first reference frame;
    c. determining motion information corresponding to the macroblock of which the area of the portion overlapping said predicted macroblcok is largest among the macroblocks in said first reference frame;

d. determining motion information corresponding to motion from the macroblock of which the area of the portion overlapping said predicted macroblock is largest to said predicted macroblock; and e. calculating, from the motion information of the above steps a, c and d, motion information for motion compensation between the second reference frame and the processing object frame.

7. A transcoding method as recited in claim 1, characterized in that said interframe prediction coding algorithm is such as to perform motion compensation for each macroblock divided from a frame, and generate coded data by performing orthogonal conversion of an interframe difference image for each block divided from a macroblock; and said interframe prediction coded data re-editing step includes:

an orthogonal conversion coefficient calculating step for calculating, for each processing object block divided from the processing object frame, an orthogonal conversion coefficient of a difference with a reference image corresponding to said processing object block in the second reference frame, using motion information and an orthogonal conversion coefficient contained in the processing object coding data and an orthogonal conversion coefficient contained in the first reference coded data.

8. A transcoding method as recited in claim 7, characterized in that in said orthogonal conversion coefficient calculating step, each of a plurality of macroblocks divided from the processing object frame is taken as a processing object macroblock, each of a plurality of blocks divided from each processing object macroblock is taken as a processing object block, and with respect to each processing object macroblock, a. determining motion information corresponding to said processing object macroblock from the first coded data of the processing object frame;

b. determining from said motion information a position of a predicted macroblock corresponding to said processing object macroblock in said first reference frame; and c. calculating, with respect to each processing object block in said processing object macroblock, an orthogonal conversion coefficient of a difference between said processing object block and a reference image corresponding to said processing object block in the second reference frame, from an orthogonal conversion coefficient of a difference image corresponding to each block having a portion overlapping a first reference block at the same position as the position of said processing object block in said processing object macroblock among first reference blocks divided form said predicted macroblock, a positional relationship between said first reference block and each block having a portion overlapping this; and an orthogonal conversion coefficient of a difference image corresponding to said processing object block.

9. A transcoding method as recited in claim 7, characterized in that, in said orthogonal conversion coefficient calculating step, each of a plurality of macroblocks divided from the processing object frame is taken as a processing object macroblock, each of a plurality of blocks divided from each processing object macroblock is taken as a processing object block, and with respect to each processing object macroblock, a. determining motion information corresponding to said processing object macroblock from the first coded data of the processing object frame;

b. determining from said motion information a position of a predicted macroblock corresponding to said processing object macroblock in said first reference frame; and c. calculating an orthogonal conversion coefficient of a difference between said processing object macroblock and a reference image corresponding to said processing object macroblock in said second reference frame, from an orthogonal conversion coefficient of a difference image corresponding to the macroblock of which the area of a portion overlapping said predicted macroblock is largest in said first reference frame, and an orthogonal conversion coefficient of a difference image corresponding to said processing object macroblock.

10. A transcoding method as recited in claim 1, characterized in that said frames are formed of a plurality of fields, each of these fields is taken as said processing object frame, and a motion information calculation or an orthogonal conversion coefficient calculation is performed for forming said second coded data.

11. A transcoding method as recited in claim 1, characterized in that the plurality of frames forming said video image is composed of a plurality of picture groups, and when each picture group contains a plurality of B frames between an I frame and a subsequent P frame or a plurality of B frames between a P frame and a subsequent P frame, said interframe prediction coded data re-editing means omits one of these B frames, and converts the remaining B frames into P frames referencing only the preceding I frame or P frame.

12. A transcoding method as recited in claim 1, characterized in that said interframe prediction coded data re-editing step comprises:

an image data restoring step of restoring image data of a plurality of frames forming said video image from said first coded data;

a motion information correcting step of determining motion information to be contained in said second coded data instead of said motion information by searching for image data restored by the image data restoring step when the motion information calculated by said motion information calculating step is inaccurate; and a coding step of performing coding using the image data obtained by said image data restoring step and the motion information obtained by said motion information calculating step and said motion information correcting step, to generate said second coded data.

13. A transcoding method as recited in claim 12, characterized in that said motion information correcting step comprises:

a prediction error decoding step of determining a first prediction error which is the difference between image data of said processing object macroblock and image data of a first reference macroblock corresponding to said processing object macroblock in the first reference frame when motion compensation is performed using motion information corresponding to said processing object macroblock contained in said first coded data for each processing object macroblock forming the processing object frame, by decoding said first coded data;

a prediction error calculating step of calculating a second prediction error which is a difference between image data of said processing object macroblock and image data of said second reference frame, by performing motion compensation using motion information calculated by said motion information calculating step for each processing object macroblock forming said processing object frame; and a motion information searching step of searching, with respect to processing object macroblocks of which said second prediction error is greater than said first prediction error by at least a predetermined value, for motion information to replace the motion information obtained by said motion information calculating step using image data of said processing object macroblock and image data corresponding to said second reference frame.

14. A transcoding method as recited in claim 12, characterized in that said motion information correcting step includes a process of setting a motion information searching range based on motion information calculated by said motion information step, and in said motion information searching step, motion information is sought in said searching range.

15. A transcoding method for converting first coded data obtained from a plurality of frames forming a video image by means of a coding algorithms including an interframe prediction coding algorithm with motion compensation into second coded data having a different structure, the transcoding method being characterized by comprising:

a motion judging step of judging the motion of a video image from motion information contained in first coded data corresponding to a plurality of frames which are the object of processing; and an interframe prediction coded data re-editing step of taking a portion of frames which have had the interframe prediction coding and are included in the plurality of frames forming the video image as processing object frames, and from at least the first coded data corresponding to the processing object frames, generating the second coded data corresponding to coded data which are to be obtained when performing the interframe prediction coding on the processing object frames with reference to second reference frames which are different from first reference frames referenced in the interframe prediction coding of the processing object frames;

said interframe prediction coded data re-editing step including a first re-editing step performed when the motion of the video image is found to be slow by said motion judging step and a second re-editing step performed when the motion of the video image is found to be quick by said motion judging step;

said first re-editing step comprising:

a first motion information calculating step of calculating motion information to be included in said second coded data from motion information contained in said processing object coded data and motion information contained in said first reference coded data; and an orthogonal conversion coefficient calculating step for calculating, for each processing object block divided from the processing object frame, an orthogonal conversion coefficient of a difference with a reference image corresponding to said processing object block in the second reference frame, using motion information and an orthogonal conversion coefficient contained in the first coded data of the processing object frames and an orthogonal conversion coefficient contained in the first coded data of the first reference frames; and said second re-editing step comprising:

a second motion information calculating step of calculating motion information to be included in said second coded data from motion information contained in the first coded data of the processing object frame and motion information contained in the first coded data of the first reference frame;

an image data restoring step of restoring image data of said plurality of frames from said first coded data;

a motion information correcting step of determining motion information to be contained in said second coded data instead of said motion information by searching for image data restored by the image data restoring step when the motion information calculated by said second motion information calculating step is inaccurate; and a coding step of performing coding using the image data obtained by said image data restoring step and the motion information obtained by said motion information calculating step and said second motion information correcting step, to generate said second coded data.

16. A transcoding apparatus for converting first coded data obtained from a plurality of frames forming a video image by means of a coding algorithms including an interframe prediction coding algorithm with motion compensation into second coded data having a different structure, the transcoding method characterized by comprising:

interframe prediction coded data re-editing means for taking a portion of frames which have had the interframe prediction coding and are included in the plurality of frames forming the video image as processing object frames, and from at least the first coded data corresponding to the processing object frames, generating the second coded data corresponding to coded data which are to be obtained when performing the interframe prediction coding on the processing object frames with reference to second reference frames which are different from first reference frames referenced in the interframe prediction coding of the processing object frames;

said interframe prediction coded data re-editing means including a motion information calculating portion for calculating motion information to be included in said second coded data using at least motion information contained in said processing object data.

17. A transcoding apparatus as recited in claim 16, wherein the interframe prediction coded data re-editing means takes a portion of frames which have had the interframe prediction coding as the first reference frames, and takes frames which have had the interframe prediction coding with reference to the first reference frames as the processing object frames, and takes frames referenced in the interframe prediction coding of the first reference frames as the second reference frames, and generates the second coded data from processing object coded data which are the first coded data corresponding to the processing object frames and first reference coded data which are the first coded data corresponding to the first reference frames; and said motion information calculating portion calculates the motion information to be included in said second coded data from motion information contained in said processing object data and motion information contained in said first reference coded data.

18. A transcoding apparatus as recited in claim 16, characterized in that said interframe prediction coding algorithm is such as to perform motion compensation for each macroblock divided from a frame, and generate coded data by performing orthogonal conversion of an interframe difference image for each block divided from a macroblock; and said interframe prediction coded data re-editing means includes:

an orthogonal conversion coefficient calculating portion for calculating, for each processing object block divided from the processing object frame, an orthogonal conversion coefficient of a difference with a reference image corresponding to said processing object block in the second reference frame, using motion information and an orthogonal conversion coefficient contained in the processing object coding data and an orthogonal conversion coefficient contained in the first reference coded data.

19. A transcoding apparatus as recited in claim 1, characterized in that said interframe prediction coded data re-editing means comprises:

a decoder for restoring image data of a plurality of frames forming said video image from said first coded data;

a motion information correcting portion for determining motion information to be contained in said second coded data instead of said motion information by searching for image data restored by the image data restoring step when the motion information calculated by said motion information calculating portion is inaccurate; and an encoder for performing coding using the image data obtained by said decoder and the motion information obtained by said motion information calculating portion and said motion information correcting portion, to generate said second coded data.

20. A transcoding apparatus for converting first coded data obtained from a plurality of frames forming a video image by means of a coding algorithms including an interframe prediction coding algorithm with motion compensation into second coded data having a different structure, the transcoding apparatus being characterized by comprising:

first and second trascoding portions for taking a portion of frames which have had the interframe prediction coding and are included in the plurality of frames forming the video image as processing object frames, and from at least the first coded data corresponding to the processing object frames, generating the second coded data corresponding to coded data which are to be obtained when performing the interframe prediction coding on the processing object frames with reference to second reference frames which are different from first reference frames referenced in the interframe prediction coding of the processing object frames; and switching means for judging the motion of a video image from motion information contained in first coded data corresponding to a plurality of frames which are the object of processing, and supplying the first coded data to the first transcoding portion when the motion of the video image is slow, and supplying the first coded data to the second transcoding portion when the motion of the video image is quick; and said first transcoding portion comprising:

a first motion information calculating portion for calculating motion information to be included in said second coded data from motion information contained in the first coded data of the processing object frame and motion information contained in the first coded data of the first reference frame; and an orthogonal conversion coefficient calculating portion for calculating, for each processing object block divided from the processing object frame, an orthogonal conversion coefficient of a difference with a reference image corresponding to said processing object block in the second reference frame, using motion information and an orthogonal conversion coefficient contained in the first coded data of the processing object frames and an orthogonal conversion coefficient contained in the first coded data of the first reference frames; and said second transcoding portion comprising:

a second motion information calculating portion for calculating motion information to be included in said second coded data from motion information contained in the first coded data of the processing object frame and motion information contained in the first coded data of the first reference frame;

a decoder for restoring image data of said plurality of frames from said first coded data;

a motion information correcting portion for determining motion information to be contained in said second coded data instead of said motion information by searching for image data restored by the image data restoring step when the motion information calculated by said second motion information calculating portion is inaccurate; and an encoder for performing coding using the image data obtained by said decoder and the motion information obtained by said second motion information calculating portion and said motion information correcting portion, to generate said second coded data.

* * * * *